(12) United States Patent
Lei et al.

(10) Patent No.: US 8,194,933 B2
(45) Date of Patent: Jun. 5, 2012

(54) IDENTIFICATION AND VERIFICATION OF AN UNKNOWN DOCUMENT ACCORDING TO AN EIGEN IMAGE PROCESS

(75) Inventors: Yiwu Lei, Ottowa (CA); James E. MacLean, Ottowa (CA)

(73) Assignee: 3M Innovative Properties Company, St. Paul, MN (US)

( * ) Notice: Subject to any disclaimer, the term of this patent is extended or adjusted under 35 U.S.C. 154(b) by 1176 days.

(21) Appl. No.: 11/955,163

(22) Filed: Dec. 12, 2007

(65) Prior Publication Data

US 2009/0154778 A1 Jun. 18, 2009

(51) Int. Cl.
*G06K 9/00* (2006.01)
(52) U.S. Cl. ........ 382/112; 382/218; 382/181; 382/209; 382/232; 382/276
(58) Field of Classification Search .................. 382/112, 382/218, 181, 209, 276, 305, 232; 250/559, 250/571; 375/340, 343; 358/403, 404; 707/821, 707/823, 825, 827, 828, 829, 830, 831
See application file for complete search history.

(56) References Cited

U.S. PATENT DOCUMENTS

| | | | |
|---|---|---|---|
| 5,159,667 A | 10/1992 | Borrey et al. | |
| 6,269,169 B1 | 7/2001 | Funk et al. | |
| 6,288,842 B1 | 9/2001 | Florczak et al. | |
| 6,631,204 B1 | 10/2003 | Smith | |
| 6,785,405 B2 | 8/2004 | Tuttle et al. | |
| 7,580,551 B1 * | 8/2009 | Srihari et al. | 382/115 |
| 7,912,291 B2 * | 3/2011 | Berkner et al. | 382/190 |
| 2001/0021270 A1 | 9/2001 | Kobara et al. | |
| 2003/0108223 A1 | 6/2003 | Prokoski | |
| 2004/0081332 A1 | 4/2004 | Tuttle et al. | |
| 2006/0017959 A1 | 1/2006 | Downer et al. | |
| 2007/0003147 A1 | 1/2007 | Viola et al. | |
| 2007/0122007 A1 | 5/2007 | Austin et al. | |
| 2007/0237427 A1 | 10/2007 | Patel et al. | |
| 2008/0031542 A1 | 2/2008 | Lei | |
| 2009/0152357 A1 | 6/2009 | Lei et al. | |

FOREIGN PATENT DOCUMENTS

KR   10-2002-057522   7/2002
(Continued)

OTHER PUBLICATIONS

U.S. Appl. No. 11/955136, filed Dec. 12, 2007, Document Verification Using Dynamic Document Identification Framework.

(Continued)

*Primary Examiner* — Samir A. Ahmed
*Assistant Examiner* — Ali Bayat

(57) ABSTRACT

Techniques are described for identifying and validating security documents according to an Eigen image process method. For example, a security document authentication device selects one or more reference documents of different document types, calculates, from the reference documents, one or more Eigen images and Eigen values for the plurality of different document types, and calculates a reference weight coefficient vector of each of the plurality of document types. Upon receiving at least one captured image of an unknown document, the device calculates a weight coefficient vector of the captured image, compares the weight coefficient vector of the captured image and each of the reference weight coefficient vectors of the document types to calculate a plurality of distances, and, based on the plurality of distances, identifies the unknown document as one of the plurality of document types.

23 Claims, 22 Drawing Sheets

FOREIGN PATENT DOCUMENTS

| KR | 10-20060013215 | 2/2006 |
| KR | 10-2007-0003759 | 1/2007 |
| WO | WO 2005/038700 | 4/2005 |
| WO | WO 2005/057506 A1 | 6/2005 |
| WO | WO 2005/116910 A2 | 12/2005 |
| WO | WO 2007/005937 A4 | 1/2007 |
| WO | WO 2009/075986 | 6/2009 |

OTHER PUBLICATIONS

P. deMallorca, "MPEG-7 Overview," Version 10, ISO/IEC JTC1/SC29/WG11 N6828, Oct. 2004.

Yang et al., "Survey on Image Content Analysis, Indexing, and Retrieval Techniques and Status Report of MPEG-7," Tamkang Journal of Science and Engineering, vol. 2, No. 3, 1999, pp. 101-118.

Turk et al., "Eigenfaces for Recognition," Journal of Cgnitive Neuroscience, vol. 3, No. 1, 1991, pp. 71-86.

Yoshimura et al., "Fast Template Matching Based on the Normalized Correlation by Using Multiresolution Eigenimages," Proc. of the IEEE/RSJ/GI Inter. Conf. on Intelligent Robots and Systems, vol. 3, 1994, pp. 2086-2093.

U. Sinha, "Principal Component Analysis for Content-based Image Retrieval," Radio Graphics, vol. 22, No. 5, 2002, pp. 1271-1289.

H.S. Sahambi, "Appearance Based Object Recognition Using Independent Component Analysis," Master Thesis of Concordia University, Montreal, Canada, Sep. 2000.

Shokoufandeh et al., "Graph-Theoretical Methods in Computer Vision," Theoretical Aspects of Computer Science, Eds. Khosrovshahi et al., Springer-Verlage, Berlin Heidelberg, 2002, pp. 148-174.

Caelli, et al., "Graphical Models for Graph Matching: Approximate Models and Optimal Algorithms," Pattern Recognition Letters, vol. 26, 2005, pp. 339-346.

Cross et al., "Graph Matching with a Dual-Step EM Algorithm," IEEE Trans. on PAMI, vol. 20, No. 11, Nov. 1998, pp. 1236-1253.

N. Vasconcelos, "Image Indexing with Mixture Hierarchies," Proc. IEEE Conf. in Computer Vision and Pattern Recognition, Kauai, Hawaii, 2001.

Lei et al., "Detection and localisation of reflectional and rotational symmetry under weak perspective projection," Pattern Recognition Letters, vol. 32, 1999, pp. 167-180.

International Search Report for International Publication No. PCT/US2009/075986.

* cited by examiner

The respective eigen values: 567.44, 386.40, 291.95, 187.61, 178.87, 138.48, 121.47

IDENTIFICATION AND VERIFICATION OF AN UNKNOWN DOCUMENT ACCORDING TO AN EIGEN IMAGE PROCESS

TECHNICAL FIELD

The invention relates to computer-aided identification and validation of security documents, such as passports, driver's licenses, birth certificates, or financial documents, using a flexible document verification framework.

BACKGROUND

Computer-aided techniques are increasingly being used to capture, identify, validate, and extract information from security documents. For example, security document readers, such as ePassport readers, are more commonly being deployed to read and confirm the authenticity of security documents. Examples of security documents include passports, credit cards, ID cards, driver's licenses, birth certificates, commercial papers, and financial documents. For some security documents, the ICAO (International Civic Aviation Organization) provides a clear procedure for identifying security documents with computer-aided techniques. For other security documents, no standards exist that specify procedures by which a computer-aided technique may identify non ICAO-compliant security documents.

In general, before the authenticity of a given security document can be confirmed, the type of security document must first be identified. For example, some modern security document readers support a variety of different types of security documents, such as passports issued by various states or countries. In order to confirm that a security document is an authentic passport, for example, it must first be determined which specific country and version of passport is being authenticated. Authentication of a British passport may require application of different algorithms and/or analysis of different portions of the passport than, for example, an Australian passport. More specifically, in order to authenticate different security documents, a security document reader may employ a wide variety of algorithms, including those analyzing document sizes, static image patterns, and/or information collected from specific positions on the document and/or storage mediums, e.g., bar codes, machine-readable zones, and RFID chips.

The process of first identifying the type of security document may present a significant challenge for non ICAO-compliant documents. One approach is to require an operator to manually select the type of security document prior to processing the document to confirm its authenticity. This approach, however, can be manually intensive and prone to error in environments that processes high volumes of security documents.

Alternatively, certain computer-aided techniques may be applied in an attempt to automatically or semi-automatically identify the type of security document. However, to date, such techniques are typically static in nature (i.e., rigidly defined). That is, a document authentication system may be statically programmed to apply a first algorithm to test for a first type of security document. If the test fails, the document authentication system applies a second algorithm to test for second type of security document. This static process continues in sequence until the security document is either identified or rejected. The rigid nature and significant processing time required by this static approach is not well-suited for document authentication systems designed to support a large number of different document types, and may limit the scalability of such a system.

SUMMARY

In general, the invention relates to techniques for identification and validation of security documents, or more generally articles, according to an extensible, efficient, and dynamic document identification framework. That is, an extensible software framework is described in which different types of security documents may be easily defined, and the framework can easily be scaled up to accommodate efficient identification and validation for large amounts of different types of security documents. Moreover, algorithms necessary for identifying each type of document may easily be added and selected from a set of shared, reusable document identification software modules. In one embodiment, the document identification software modules may be logically divided into "classifiers," "verifiers," and "validators"). The document identification framework includes a set of nodes organized as a hierarchical, tree-like structure, traversal of which separates documents into document types and sub-types based on application of the reusable document identification software modules.

When identifying a type of document, a document processing engine selectively traverses paths through the hierarchical document identification framework based on the results of the classifiers at each parent node in the tree. That is, one or more computationally efficient classifiers may be applied at each parent node within the hierarchical document identification framework to determine whether to traverse to any of the node's child nodes. The classifier(s) compare general characteristics of the unknown document to characteristics of child nodes that represent sub-document types. The classifiers for the given node returns a subset (e.g., in the form of a list) that may contain zero or more child nodes that represent possible reference document object types.

While traversing the hierarchical document identification framework, more computationally intensive verifiers may also be applied for each child node in the subset to apply more constraint to further confirm in high accuracy that security document has the appropriate characteristics for child nodes identified by the classifiers. As described herein, the order of evaluation of the child nodes may be based on a confidence or similarity score, and the child node with the highest similarity score with respect to the unknown document may be selected. In some embodiments, a threshold confidence level or similarity score must be met before any of the child nodes can be considered a potential match for the unknown document. Once selected, the child node is viewed as a parent node and the traversal process continues in a recursive manner to again apply classifiers and verifiers with respect to the new parent node.

Upon reaching a leaf node, this final parent is viewed as the identification result. At this point, a set of one or more validators for the resulting identification node are applied in an attempt to confirm the authenticity of the security document. The validators typically use image comparison algorithms to compare any security features of the unknown document to one or more known references to return a confidence level or similarity score. The unknown document is considered verified authentic if the similarity scores exceed an authentication threshold.

In this way, the order in which the algorithms defined by the document identification modules are applied (i.e., the manner in which the framework is traversed) is dynamic based on the particular attributes of the security document being identified. This approach provides for an efficient, scalable document authentication system that can easily be extended to support hundreds or even thousands of different types of security documents.

For example, identification and subsequent validation of security documents may involve data from the security document, e.g., from a machine readable zone (MRZ), a barcode, a magnetic strip, text content, security images, or a radio-frequency identification (RFID) chip embedded within the security document. According to the principles described herein, a security document authentication system traverses the hierarchical framework by executing the classifiers and verifiers defined by the framework to process the data from the security document and determine whether the security document contains certain identifying characteristics. The hierarchical nature of the framework, as well as its use of reusable document classifiers to identify categories and subcategories of types of documents, allows security documents to be quickly and efficiently identified even in situations where many different types of documents are supported. The techniques described herein, therefore, may be particularly useful for maintaining a dynamic document identification framework in a manner that narrows down the number of comparisons necessary to quickly identify and subsequently confirm authenticity of a security document despite the growing number of security documents presently available worldwide.

For example, the techniques of the invention may be embodied in a security document authentication device. This device may include an image capture interface that receives captured image(s) of an article and a memory that stores a plurality of document type objects within a data structure according to the dynamic document identification framework. The security document authentication device also includes a document processing engine that traverses the data structure by selectively invoking one or more of the plurality of processes to identify the security document as one of the plurality of document type objects. Typically, the data structure comprises a tree-like data structure to yield greatly fewer comparisons between the captured image(s) and the document type objects. Moreover, by using a dynamic data structure, such as a tree data structure, the data structure may easily extend to cover the growing number of security documents, and may dynamically adapt during runtime to accommodate, on the fly, additional data structures.

In one embodiment, a method comprises receiving one or more captured images of an unknown document, and storing a plurality of document type objects within a data structure according to a dynamic document identification framework, wherein the plurality of document type objects reference a plurality of recursive processes for extracting attributes from the captured images to categorize and verify the unknown document as a document type represented by one of the document type objects. The method further comprises traversing the document type objects of the data structure in a variable order based on the attributes extracted by application of the plurality of the recursive processes to the captured images, and identifying the unknown document as one of the plurality of document type objects upon traversing the data structure.

In another embodiment, a security document authentication device comprises an image capture interface that captures one or more images of an unknown document and a memory that stores a plurality of document type objects within a data structure according to a dynamic document identification framework, wherein the plurality of document type objects reference a plurality of recursive processes for extracting attributes from the captured images. The device further comprises a document processing engine that traverses the document type objects of the data structure in a variable order based on the attributes extracted by application of the plurality of the recursive processes to the captured images, wherein the document processing engine identifies the unknown document as one of the plurality of document type objects upon traversing the data structure.

In another embodiment, the invention is directed to a computer-readable medium containing instructions. The instructions cause a programmable processor to receive captured images of an article and store a plurality of document type objects within a data structure according to a dynamic document identification framework, wherein the plurality of document type objects reference a plurality of processes. The instructions further cause the processor to traverse the data structure by selectively invoking one or more of the plurality of processes to identify the captured images as one of the plurality of document type objects.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
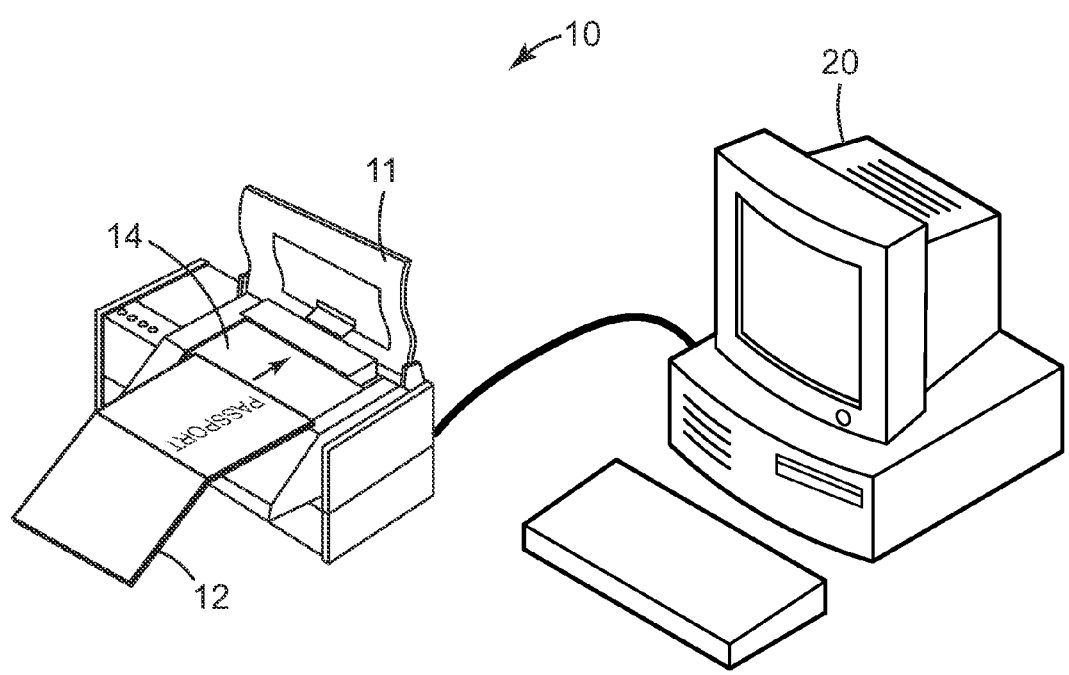
FIG. 1 is a schematic representation illustrating an exemplary document authentication system 10 for analyzing a security document 12 in accordance with the principles of the invention.

FIG. 1 is a schematic representation illustrating an exemplary document authentication system 10 for analyzing a security document 12 in accordance with the principles of the invention. Document authentication system 10 includes a host system 20 coupled to a document reader 11, such as an ePassport document reader. Document reader 11 works as an image capture device and confirms that security document 12 is a valid, authentic security document. As described herein, document reader 11 supports a wide-variety of types of security documents. As part of the authentication, document reader 11 first identifies the particular type of security document inserted into the device. For example, security document 12 may be a United States passport, a United States state-specific driver's license, a United States state-specific identification card, a European Union (E.U.) driver's license, a E.U. identification card, passports or identification documents issued by various state or country governmental agencies throughout the world, title documents, identification cards, and a variety of other document types. After identifying the type of security document, document authentication system 10 may proceed to validate and extract information from security document 12.

For example, host computer system 20 of document authentication system 10 may be used to direct document reader 11 to initially capture a sequence of one or more images of all or portion of security document 12. Next, a two-stage process is employed by which document authentication system 10 first identifies the type of security document and then confirms that security document 12 is a valid document of the identified type based on analysis of the captured image data, possibly in conjunction with other data obtained from the security document. For example, in addition to the scanned image data captured from security document 12, document authentication system 10 may utilize data received from one or more machine-readable zones (e.g., barcodes), data received from radio frequency identification (RFID) chips embedded within or affixed to the document, or other sources of information provided by the document.

As described herein, host computer 20 provides an operating environment for a document processing engine that utilizes a dynamic document identification framework that can easily be extended and modified so as to support a wide variety of types of security documents. That is, the document identification framework provides an environment in which identification algorithms can easily be added, defined and leveraged across different types of security documents. The document processing engine interacts with the framework as necessary to invoke various algorithms to categorize and ultimately identify security document 12 as a particular type of document, e.g., a security document issued by a specific agency and having certain characteristics and layout features required for subsequent authentication.

Document authentication system 10 begins the process of identifying security document 12 by scanning the securing document to capture a sequence of one or more images from all or portions of security document 12. Next, document authentication system 10 traverses a data structure that stores data defining a plurality of document type objects according to the dynamic document identification framework. The plurality of document type objects are arranged hierarchically in the form of nodes, and each represent categories or sub-categories of types of security documents. Each object may reference (i.e., contain pointers to) any of a plurality of executable document identification software modules (, i.e., executable "classifiers," "verifiers" and "validators," that provide algorithms necessary to categorize, sub-categorize and ultimately identify and authenticate a particular document type. For example, each of these document identification software modules typically implements an associated document identification algorithm capable of determining one or more attributes of a document. Based on whether the attribute in question is present within the particular security document 12, the processing engine traverses the document framework to select and apply subsequent classifiers. Example document identification software modules include an Eigenimage document matching algorithm or a document layout matching algorithm, both of which are described in more detail below.

While traversing the data structure of the document identification framework, document authentication system 10 selectively invokes one or more of the plurality of document identification software modules to process portions of the captured image data and/or interrogate security document 12 to obtain additional data. For example, when identifying a type of document, a document processing engine of document authentication system 10 starts at a root node of the hierarchical document identification framework and then selectively traverses paths through the nodes of the framework based on the results of the algorithms defined by classifiers at each parent node in the framework. That is, one or more computationally efficient classifiers may be applied at each parent node within the hierarchical document identification framework to determine whether to traverse paths to any of the child nodes of that parent node. These classifiers refer to characteristics of the sub-document types represented by the child nodes and are used for general comparisons for path selection. The classifiers compare general characteristics of the unknown document to characteristics of child nodes that represent sub-document types. The classifiers for the given node returns a subset (e.g., in the form of a list) that may contain zero or more child nodes that represent possible reference document object types. The classifiers may be stored in the form of linked indexes and return a set of possible reference document object types.

While traversing the hierarchical document identification framework, verifiers associated with the parent node, the child node, or both, may be applied to attributes extracted by higher-level classifiers to further confirm that security document has the appropriate characteristics for the child nodes selected by the classifiers. The verifiers refer to characteristics of the document type represented by the node itself and are further used in the identification process, and the algorithms specified by the verifiers impose more strict constraint on this particular document type for a correct identification result and may be more computationally intensive than the algorithms specified by the classifiers. The combination of classifiers and verifiers provides an efficient and flexible structure for balancing the needs both for the high speed and accuracy. As described herein, the order of evaluation of the child nodes may be based on a confidence or similarity score, and the child node with the highest similarity score with respect to the unknown document may be selected. In some embodiments, a threshold confidence level or similarity score must be met before any of the child nodes can be considered a potential match for the unknown document. Once selected, the child node is viewed as a parent node and the traversal process continues in a recursive manner to again apply classifiers and verifiers with respect to the new parent node.

Upon reaching a leaf node (i.e., a node in the framework without any child nodes), a set of one or more validators is applied in an attempt to confirm the authenticity of the security document. The validators refer to characteristics of the document type represented by the leaf node and may be more computationally intensive than the algorithms specified by either the verifiers or the classifiers, although this need not be required. The validators typically use image comparison algorithms to compare any security features of the unknown document to one or more known references to return a confidence level or similarity score. The unknown document is considered confirmed authentic if the similarity score exceeds an authentication threshold.

In this way, document authentication system 10 traverses the document identification framework and selectively invokes the document identification software modules to identify and ultimately validate the unknown document. Thus, the process implemented by the dynamic document identification framework is "dynamic" in that the document identification framework directs document authentication system 10 to invoke certain operations depending upon the result of previously invoked document identification software modules; the starting point within the hierarchy and the order of invocation of the processes vary based on the particular security document being identified. That is, document authentication system 10 may, for example, subsequently apply first, second, and third operations to analyze a United States passport security document 12, but subsequently apply the first, third, and fifth operations to analyze a United States driver license security document 12, where each operation individually determines only one or more attributes of the security document. In this regard, the techniques are unlike conventional systems that are typically required to statically apply complete document identification algorithms in a predefined order regardless of the type of security document 12 under authentication. As described in further detail below, this dynamic aspect facilitates more efficient and comprehensive security document verification by selectively and dynamically employing a set of processes based on the analysis of the captured image(s) itself.

Document authentication system 10 may store the document identification framework as a hierarchically arranged, tree-like data structure within a memory, database, or other storage media (not shown in FIG. 1). Data structures referred to herein as document object types are used to represent each node within the tree-like data structure. Parent nodes represent categories or sub-categories of document types and can be recursively traversed down into the multiple levels of the hierarchy. The leaf nodes represent specific document types, e.g., a United States passport document type object, a United States driver's license document type object, or a United States identification card document type object. Some of the document type objects within the framework may include one or more stored images or templates as well as a set of specified characteristics that clearly delineate one document type object from another. For example, a United States passport document type object may comprise an image of a template United States passport as well as a set of characteristics defining the occurrence of a machine-readable zone at the bottom of the United States passport template image, measurements delineating the placement of a picture within the template, and other data directed at determining the relative positions between various characteristics.

Document authentication system 10 may traverse the data structure of the framework, invoking one or more executable classifiers, verifiers and validators referenced by the document type objects. Depending on the particular document identification software modules invoked, document authentication system 10 may compare the document type object to the captured image(s) or perform some other analysis of the image data and/or other data obtained from the security document so as to produce a certainty value indicating a degree of similarity that security document 12 matches the category, sub-category, or particular document type. If the certainty value exceeds a programmable or calculated minimum certainty level for multiple classifier and/or verifier associated with a parent node, document authentication system 10 traverses multiple paths through the framework from that parent node until the security document 12 is identified by ultimately returning the highest certainty value upon reaching one or more leaf nodes.

After successfully identifying that security document 12 conforms to one of the plurality of stored document type objects, document authentication system 12 performs the authentication process to confirm the authenticity of the security document. For example, document authentication system 12 may analyze the captured image(s) to determine whether one or more occurrences of a stored reference image are present within the security document. If the reference image is present within the security document, document authentication system 10 may provide an indication (e.g., audible and or visual) that security document 12 has been properly authenticated. If the reference image is not present within the captured image, document authentication system 10 provides an indication that security document 12 cannot be automatically authenticated and may be denied.

In operation, a user places security document 12 onto view frame 14 of the document reader 11. View frame 14 accurately locates security document 12 with respect to other components of document authentication system 10. In the exemplary embodiment of FIG. 1, document authentication system 10 includes light source(s) to illuminate security document 12 placed onto view frame 14. In some embodiments, document authentication system 10 may include more than one light source, such as an infra-red (IR) light source and/or a ultra-violet (UV) light source. Document authentication system 10 further includes an image capture device to capture the image data from security document 12. The image capture device may be a CMOS image sensor, such as a charge coupled device (CCD) having an array of pixels, a camera, a line scanner or other optical input device. Host system 20 may interact with security reader 11 to issue commands for capturing image data, interrogating an RFID chip or performing other operations relative to security document 12. The intensity of the light source may be adjusted through a range of intensities from a minimum value to a maximum value either automatically by host system 20 or based on input from the user.

After the user has placed security document 12 into view frame 14, document reader 11 captures a sequence of one or more images of security document 12. The captured images may represent all or a portion of security document 12, but typically the captured images represent all of security document 12. Image capture device 11 communicates the captured image data to host system 20 for image processing. Captured image(s) processed by host system 20 can be displayed for examination on a display (not shown) associated with host system 20. Host system 20 may comprise, for example, a computer, laptop, mobile personal digital assistant (PDA) or other computing system having sufficient processor and memory resources to analyze the captured image(s). Example configuration and operation of host system 20 are described in further detail below.

Figure 2:
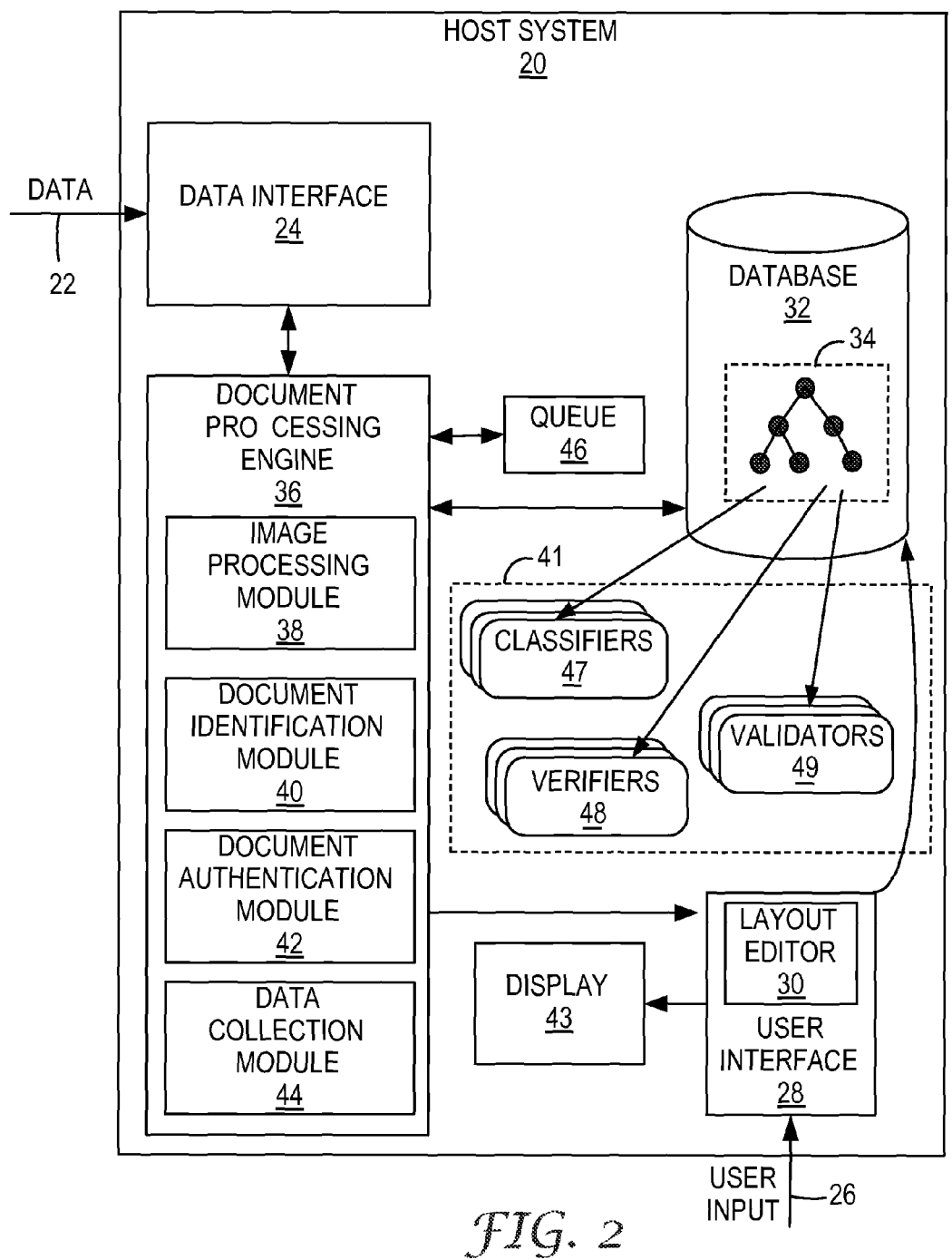
FIG. 2 is a block diagram illustrating an exemplary host system that verifies an article according to a dynamic document identification framework in accordance with the principles of the invention.

FIG. 2 is a block diagram illustrating an exemplary host system 20 that authenticates an article, such as security document 12 of FIG. 1, according to a dynamic document identification framework to identify security document 12 in accordance with the principles of the invention. Host system 20 analyzes image data 22 and optionally other data (e.g., RFID data) received from document reader 11 (FIG. 1) to dynamically identify security document 12.

In this example, host system 20 includes a data interface 24 to receive data (e.g., image and RFID data) from document reader 11. Data interface 24 may be, for example, a serial or parallel hardware interface for communicating with document reader 11. As another example, data interface 24 may be a universal serial bus (USB) interface.

As shown in FIG. 2, document identification framework 34 may be represented as a tree-like structure having a plurality of nodes, where the nodes represent categories of security documents, sub-categories of security documents, or specific type of security documents. Each of the nodes of document identification framework 34 may include one or more references to a set of document identification software modules 41 that includes classifiers 47, verifiers 48 and validators 49, each of which contain executable instructions defining processes for checking for one or more attributes or characteristics of a security document. As one example, one of classifiers 47 associated with a parent node may determine whether a machine-readable zone (MRZ) exists in a certain location of the security document, thus narrowing down the potential types of security documents to a particular class. One of verifiers 47, either associated with the parent node or one of its child nodes, may further process the MRZ to confirm that a specific sequence of text identifiers is present within the MRZ text. In this respect, verifiers 48 confirm the attributes extracted by higher-level classifiers in the document tree hierarchy, such as whether the above specific sequence of text identifier is present, e.g., "AU", to further narrow down the set of possible types of documents to Australian documents. Ultimately, upon reaching a leaf node (i.e., a node in the framework without any child nodes), a set of one or more validators 49 referenced by that leaf node is applied in an attempt to confirm the authenticity of the security document.

Host system 20 includes a user interface 28 that provides a layout editor 30, whereby a user (not shown) may edit data stored within a database 32. In particular, a user may interact with a graphical user interface presented by layout editor 30 to edit document types stored to database 32 to extend document identification framework 34 to support different document types. For example, in some instances, a user may interact with layout editor 30 to manually specify a new document type object for insertion into document identification framework 34. At this time, the user may define the attributes present to define the category, sub-category or individual document type. In addition, the user may associate the document object being inserted with one or more new or existing algorithms for storage as classifiers 47, verifiers 48 and validators 49.

Alternatively, host system 20 may be placed in a "learn" mode to adaptively update document identification framework 34 upon receiving and processing image data and other data 22 from a template of a new type of security document. In this mode, host system 20 processes the data and automatically inserts a new document type object into document identification framework 34 that conforms to any identified attributes of the new type of security document.

Thus, user input 26 may interact with user interface 28 to specify commands to edit a document type object, such as commands that add or remove classifiers 47, verifiers 48 and validators 49 associated with a pre-defined document type object, to insert a new document type object either manually or automatically, to remove a document type object, to re-order the nodes of document identification framework to prioritize the application of classifiers 47, verifiers 48, validators 49 and other commands. As such, a user may engage layout editor 30 to tailor document identification framework 34 to more quickly identify security document types.

The image data received by data interface 24 may represent captured image(s) of all or a portion of security document 12. As discussed above, the image data may contain one or more images, text, MRZ, barcode, watermarks, or other information. Host system 20 includes a document processing engine 36 that receives the captured data and performs the above described identification and subsequent authentication processes. In this example, document processing engine 36 includes an image processing module 38 and a document identification module 40 to perform the document identification process. Document processing engine 36 also includes document authentication module 42 to confirm the authentication of the security document once identified, and a data collection module 44 that extracts relevant information from the article, e.g., security document 12 being verified and authenticated. In particular data collection module 44 may engage document reader 11 to read bar codes, interrogate RFID chips, and read magnetic strips present on security document 12, thereby collecting additional data that may not be contained in the image data.

Upon receiving the captured image data, image processing module 38 may invoke image pre-processing algorithms to generate better quality gray, color or binarized images from the captured image data. For purposes herein, these processed captured images are referred to as captured images, and "captured images" should be construed to mean any image, whether processed or not, reflecting underlying security document 12. Image processing module 38 may determine whether image processing is necessary based upon the type of light source used when capturing the image, e.g., a UV light source may require certain image processing algorithms, or based upon certain aspects of the captured image(s), e.g., a dark background with light text may require certain inversion image algorithms. Once the image data has been pre-processed, document identification module 40 further analyzes the image data as well as other data obtained by data collection module 44 to identify the type of security document.

Specifically, upon receiving the captured image data, document identification module 40 traverses document identification framework 34 stored to database 32 to either identify the security document as one of the document type objects supported by document identification framework 34 or reject the security document. Database 32 may reside locally within a memory or computer-readable medium of host system 20; however, in other embodiments, database 32 may exist remote from host system 20 and couple to host system 20 via a network connection or some other remote access method, such as a virtual private network over a public network. Database 32 may include any type of database, such as a relational database, or any other type of memory capable of storing document identification framework 34.

Document identification framework 34 is organized as a tree-like data structure for easy extensibility. As described in more detail below, document identification module 40 traverses document identification framework 34 by selectively invoking a plurality of classifiers 47, verifiers 48 and validators 49 to categorize and ultimately identify the security document as one of the plurality of document type objects stored to document identification framework 34.

After traversing document identification framework 34, document identification module 40 may communicate the identified type of security document to user interface 28, whereupon user interface 28 may present the chosen document type to the user via display 43 for approval by the user. Alternatively, user confirmation may not be required. In any case, upon identification of the security document as a particular document type object, document authentication module 42 begins the authentication stage, as described above. Throughout either of the identification or authentication stages, data collection module 44 may extract information from the image(s) requested from database 32. Once authenticated, document processing engine 36 typically communicates the result of authentication to user interface 28, whereupon user interface 28 presents this result to display 43. Display 43 may include a Liquid Crystal Display (LCD), a flat panel display, a plasma display, a cathode-ray tube (CRT) display, or any other type of display capable of presenting graphics, text, and video.

Host system 20 may also include a queue data structure 46 ("queue 46") that stores recently identified document type objects. Thus, upon identifying security document 12 as a United States passport document type object, for example, document processing engine 36 may store the United States passport document type object or a reference thereof to queue 46. Upon receiving a request to identify another security document, document identification module 40 may first attempt to identify security document as one of the document type objects stored to queue 46 before traversing document identification framework 34 for other possibilities. In some cases, the next identified document may be another side of the same document. In this case, document processing engine 36 automatically correlate the information and combine the two sets of information as one output. Although shown in FIG. 2 as separate, queue 46 may reside within database 32. Host system 20 may include any type of memory capable of storing a queue data structure such as a Random Access Memory (RAM), a magnetic disk or hard drive, a Digital Video Disk (DVD), a Compact Disk (CD), a flash Read Only Memory (ROM), and a thumb drive. Alternatively, document processing engine 36 may alter the arrangement and/or traversal path of document identification framework so as to prioritize recently identified types of security documents.

Figure 3:
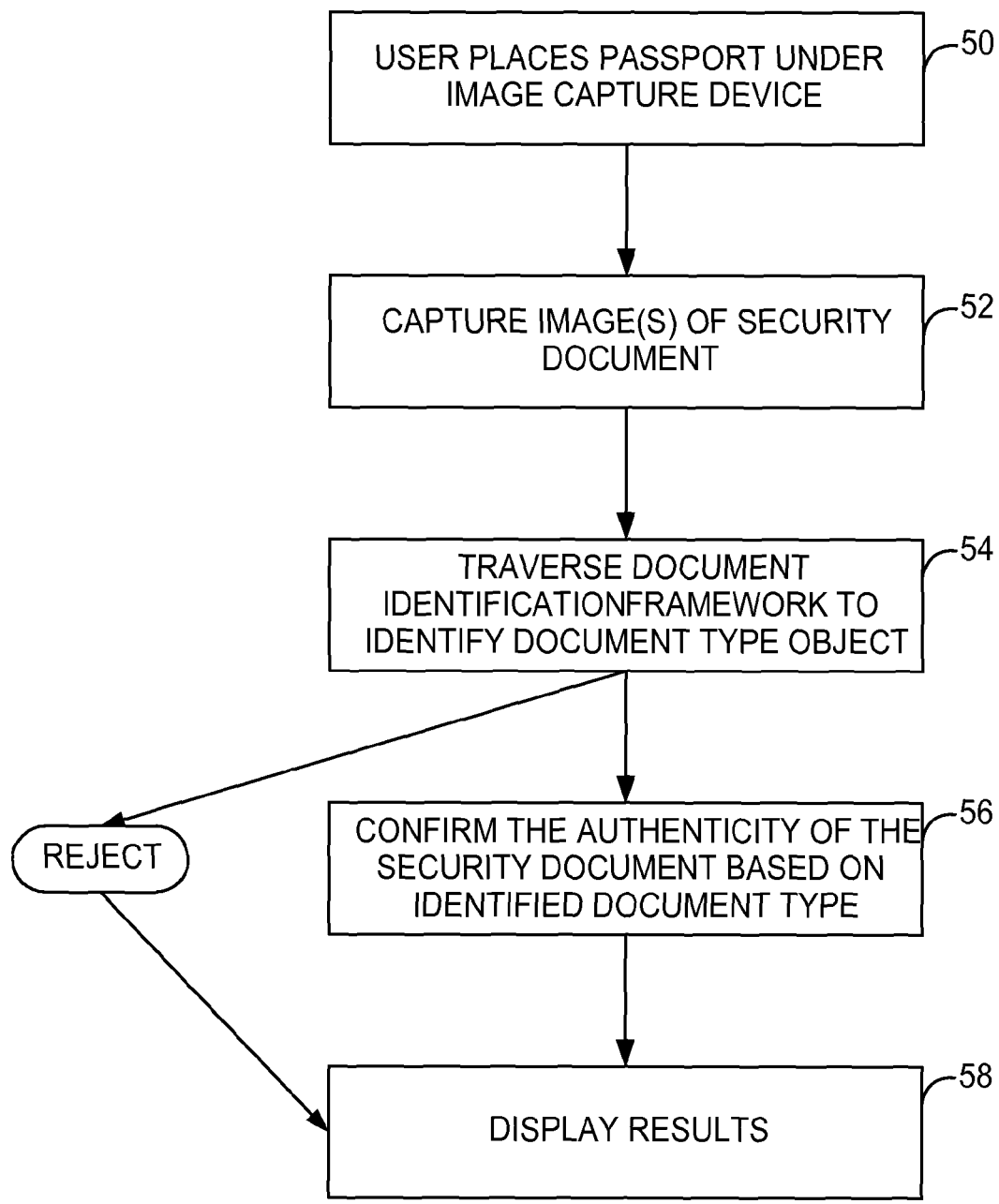
FIG. 3 is a flowchart illustrating example operation of the document authentication system of FIG. 1.

FIG. 3 is a flowchart illustrating example operation of the document authentication system 10 of FIG. 1. Initially, host system 20 stores one or more document type objects to a data structure, such as document identification framework 34 of FIG. 2, according to a dynamic document identification framework. Next, a user places a security document 12, such as a passport, within view frame 14 under image capture device 11 (50). Host system 20 receives and stores a sequence of one or more captured images of security document 12 (52).

Once stored, host system 20 identifies the captured image(s) by traversing document identification framework 34. Host system 20 traverses the data structure by selectively invoking one or more of document identification software modules 41 to identify the unknown document as one of the plurality of document type objects stored to document identification framework 34 (54). The dynamic document identification framework specifies guidelines for ensuring that the data structure remains extensible, flexible, and efficient. That is, the dynamic document identification framework specifies the protocol for traversing, editing or deleting objects from, and inserting objects to the data structure, or more generally, the protocol for maintaining the integrity of document type data structure 32.

Upon identifying the unknown document (unless no match is found and the document is rejected), host system 20 may authenticate the security document based upon the availability of certain security features specific to the particular document type object identified during verification (56). For example, the identification process may result in identification of the security document as a United States passport document type object. Host system 20, during authentication, may access the United States passport document type object within data structure 34 to determine security features relevant to authenticating a United States passport. Host system 20 may next invoke the correct processes referenced by the document type object to begin authenticating all relevant security features by, for example, reading a MRZ, performing various image template matching algorithms that search for watermarks, reflective insignia, or other such markings, and scan the text for consistency. Once complete, host system 20 may display the result of the identification process, the authentication process, or both and other collected information to a user via display 43 or produce any other suitable audio or visual indicator (58).

Figure 4:
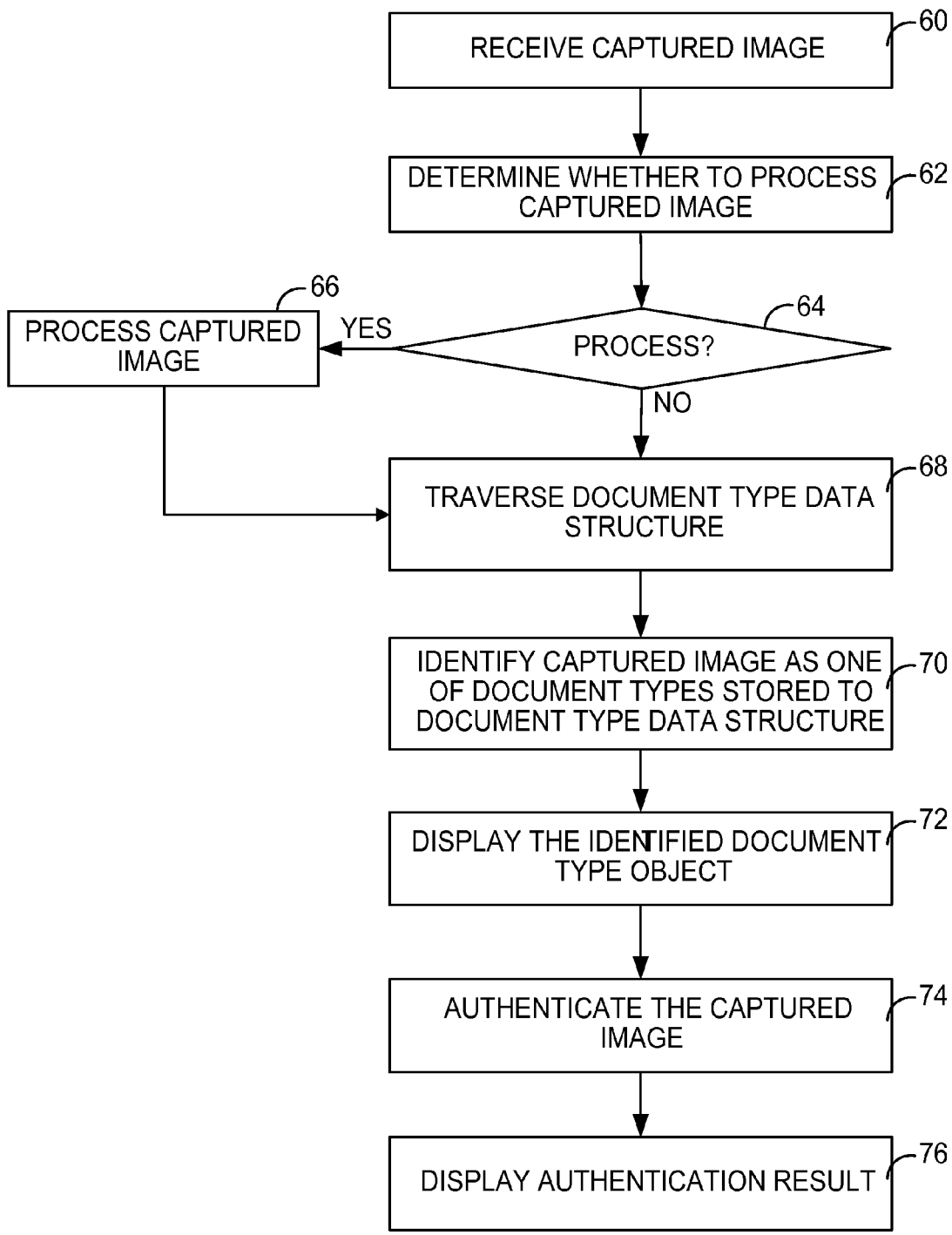
FIG. 4 is a flowchart illustrating example operation of the host system of FIG. 2 in further detail.

FIG. 4 is a flowchart illustrating example operation of host system 20 in FIG. 2 in further detail. Host system 20 verifies security document 12 of FIG. 1 by analyzing at least one captured image of security document 12. As described above, host system 20 receives captured image(s) of security document 12 via data interface 24 (60) for pre-processing by document processing image engine 36.

Document processing image engine 36 comprises image processing module 38 that may determine whether the captured image requires further image processing to facilitate the identification and authentication processes (62). Upon determining that the captured image requires additional image processing ("YES" branch, 64), image processing module 38 may perform one or more image enhancement algorithms to enhance the quality of the captured image (66) and, once finished, transmit the captured image to document identification module 40 for identification. If no further image processing is required ("NO" branch, 64), image processing module 38 transmits the captured image to document identification module 40 for identification directly.

Document identification module 40 initiates the identification process by traversing document identification framework 34 from a root object of the framework (68). Generally, document identification module 40 may traverse document identification framework 34 according to three levels of control for higher performance. Under a first priority-based traversal method, document identification module 40 may traverse document identification framework 34 according to priorities associated with the document type objects stored to document identification framework, where the priorities may be predefined by the user. Under the second queue-based traversal method, document identification module 40 may access queue data structure 46 to determine which document type objects were just previously processed and traverse these document type objects stored within document identification framework 34. Under the third dynamic traversal method, document identification module 40 dynamically traverses the full document identification framework 34. That is, document identification module 40 may, starting from the root object of document identification framework 34, invoking one or more of the plurality of classifiers 47 referenced at each parent node object of the framework. Based on the results received from invoking these classifiers 47, document identification module 40 may select one or more of the child nodes of the parent node traverse down to a lower-level object stored to document identification framework 34. Document identification module 40 may apply one or more of verifiers 48 associated with either the parent node or the selected child node(s) to confirm that security document has the appropriate characteristics for the path selected by the classifiers.

This identification of traversal may continue until document identification module 40 reaches a leaf node the reference a set of one or more validators that match the attributes of the document and, therefore, identifies the captured image(s) as the best match or a satisfied match above a predefined threshold with respect to the plurality of document type objects stored to document identification framework 34.

Document identification module 40 may apply (either subsequently or in tandem) two or more of any of the preceding methods traversal methods. Thus, document identification module 40 may, for example, first access queue data structure 48, traverse the data structure according to the queue, and next, dynamically traverse data structure 34 by selectively invoking one or more of the plurality of classifiers 47.

Based on the traversal of document identification framework 34, document identification module 40 identifies the captured image(s) as one of the plurality of document type objects stored to document identification framework 34 (70). As described above, during dynamic traversal of document identification framework 34, document identification module 40 may calculate certainty values and compare these certainty values to other certainty values or pre-specified minimum certainty values in order to properly identify the capture image(s). Once identified, document identification module 40 may display the identified document type object along with the certainty value to the user for approval via display 43 (72).

Once identified and approved by the user, if required, document identification module 40 transmits the captured image(s) along with the identified document type object, or reference thereto, to document authentication module 42. Document authentication module 42 performs the authentication process, as outlined above, to determine the authenticity of security image 12 (74) and displays this authentication result via display 43 (76).

Figure 5:
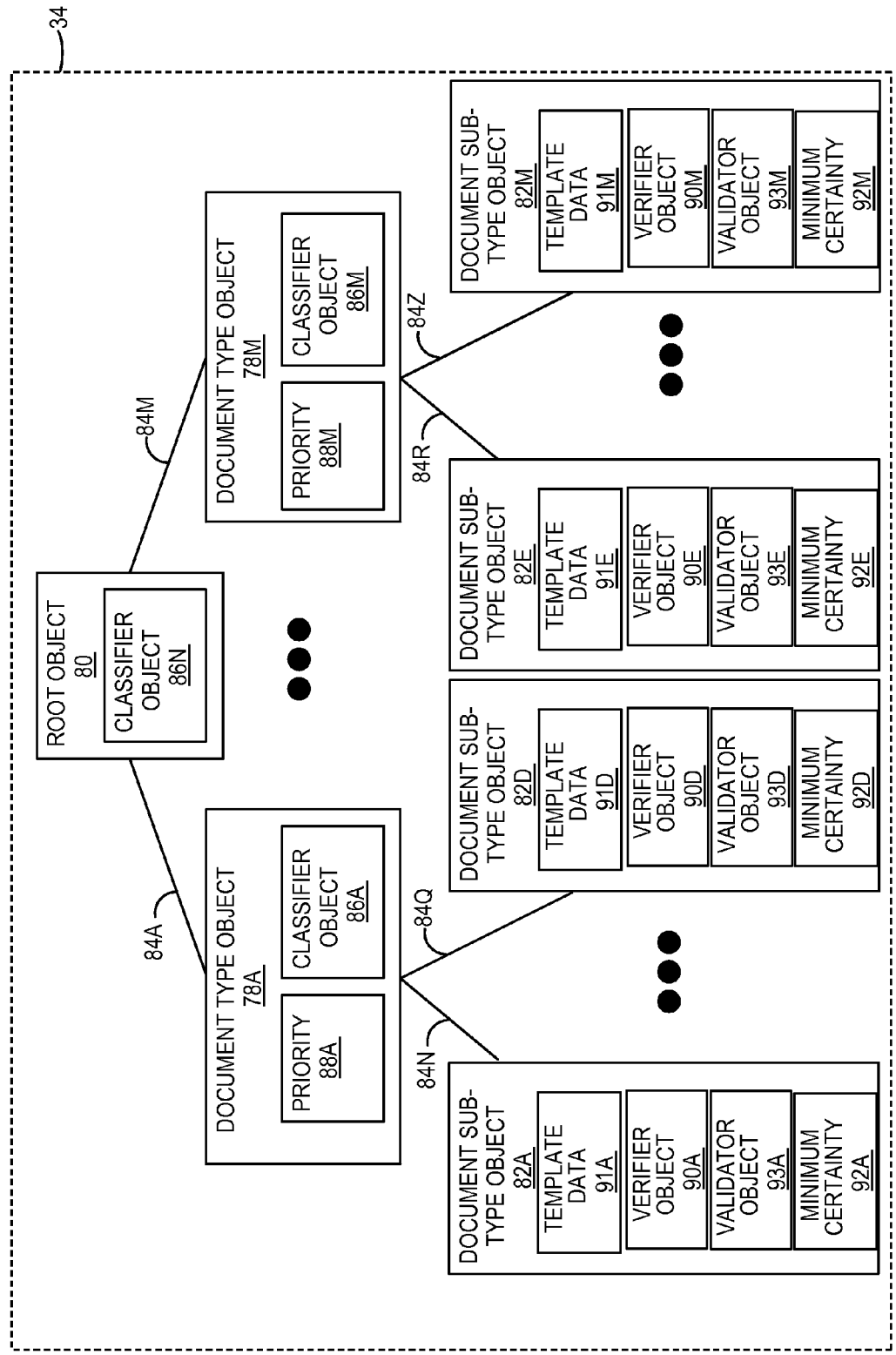
FIG. 5 is a block diagram illustrating the document identification framework of FIG. 2 in more detail.

FIG. 5 is a block diagram illustrating document identification framework 34 of FIG. 2 in more detail. As shown in FIG. 5, document identification framework 34 comprises a tree data structure; however, document identification framework 34 may comprise any other type of data structure capable of storing a plurality of document type objects 78A-78M ("document type objects 78").

In this example, document identification framework 34 comprises a root object 80, a plurality of document type objects 78, and a plurality of document sub-type objects 82A-82M ("document sub-type objects 82"). And further, this tree could expand down by sub-sub-type document objects and recursively more by the same construction. Root object 80 represents the root of exemplary tree document identification framework 34, or more generally, the object on which document identification module 40 begins traversal, if traversing solely according to the dynamic traversal method described above. Root object 80 maintains bidirectional links 84A-84M (e.g., pointers) connecting root object 80 to each of document type objects 78. Document type objects 78 also maintain bidirectional links 84N-84Z connecting document type objects 78 to document sub-type objects 82. Links 84A-84Z ("links 84") may comprise references to addresses where one of root object 80, document type objects 78 and document sub-type objects 82 are stored within database 32. In general, document type objects 78 and document sub-type objects represent a hierarchical organization of security document categories, sub-categories and individual document types (leaf nodes) based on common physical attributes, security features or layout characteristics of the security documents. Although shown for purposes of example as having three tiers, any number of levels may be repeated to categorize and ultimately individually identify types of security documents.

Root object 80 includes at least one classifier object 86N that references one or more of the plurality of classifiers 47 of FIG. 2. These references may specify unique identifiers, names or addresses of locations in memory at which the referenced classifiers 47 reside. As parent nodes, document type objects 78 include multiple classifier objects 86, and some of the classifiers could be duplicated. As shown in FIG. 5, document type objects 78 each include references to respective classifier objects 86A-86M. Classifier objects 86A-86M ("classifier objects 86") each reference one or more of the plurality of classifiers 47 that contain executable software for performing "classifier processes" to evaluate one or more characteristic or attribute of the security document being identified. Each of document type objects 78 may also include a respective priority value 88A-88M ("priority values 88"), although, again, document type objects 78 need not include a priority value. As described above, priority values 88 may delineate a certain traversal order by which document identification module 40 traverses document identification framework 34.

Although not shown in FIG. 5, any of document type objects 78 or document sub-object types 82 may contain references to verifier objects 90A-90M that may be applied to confirm that security document has the appropriate characteristics for the path selected by the classifiers 86. Upon reaching a leaf node, a set of one or more validators is applied in an attempt to confirm the authenticity of the security documents.

Document sub-type objects 82 represent leaf nodes and, as such, each includes a respective validator object 93A-93M that reference one or more validators 49. In addition, document sub-type objects 82 include respective template data 91A-91M ("template data 91"), and one or more respective minimum certainty values 92A-92M ("minimum certainty values 92"). Validator objects 93A-93M reference one or more of the plurality of validators 49 via pointer or unique identifier that make comparisons or otherwise to confirm the presence or absence of particular attributes or characteristics collected by the respective classifiers of the parent node and potentially any verifiers so as to confirm the identity of a security document 12. Although not shown in FIG. 5, in some embodiments, each of document sub-type objects 82 may include multiple verifier objects, where each of these multiple verifier objects reference one or more verifier processes. Template data 91 generally defines any template images, layout characteristics, security features, and any other data associated that may be necessary to use when classifying and/or verifying a particular one of document sub-type objects 82. In general, verifiers 48 return certainty values for a particular attribute in accordance with the classifier processes of possible document type or sub-type objects depending on the current location of document identification module 40 within document identification framework 34. For example, as described, a set of particular classifier(s) 47 and respective verifier(s) of a document node may return a ranked set of its sub-document type objects 78 that may correspond to the type of the current security document being analyzed. Document identification module 40 may compare the returned certainty values to a respective one of minimum certainty values 92.

In order to identify a current security document 12, document identification module 40 typically traverses document identification framework 34 according to the dynamic traversal method. Via this dynamic method, document identification module 40 starts at root object 80 in order to invoke the classifiers 47 referenced by classifier object 86N. These initial classifiers 47 analyze the capture images and other data obtained from security document 12 and return a set of possible document type objects represented by the child nodes, i.e., document type objects 78. The set may specify any one or more of document type objects 78.

Upon traversing to one of document type objects 78, document identification module 40 accesses the associated classifier objects 86A-86M, invokes the referenced classifiers 47, and receives a set of possible attributes or characteristics. Then for each of child sub-document objects, the respective verifier objects 90A-90M are used to compare with the expected values and produce a similarity certainty factor, and based on that the matching similarity is ranked between the security document and the sub-document type for ultimate selection of one or more of the paths to document sub-type objects 82. In this manner, framework 34 can be vertically traversed to categorize, sub-categorize, and ultimately identify a security document.

The traversal could repeatedly do down the tree until reaching a leaf node, which represents a particular security document. These classifiers 47 and verifiers 48 may return one or more certainty values, and document identification module 40 may calculate a weighted average of these certainty values according to an equation stored within the document sub-type object 82 under traversal. Using this weighted average, document identification module 40 may compare the weighted average to minimum certainty value 92 associated with the document sub-type object 82 under traversal to confirm whether security document 12 is indeed that particular type of security document. Should the weighted average not meet or exceed the associated minimum certainty value 92, document identification module 40 may discard the whole branch associated with document sub-type object 82 from further consideration, thereby improving efficiency. Document identification module 40 may continue to iterate through the remaining set of possible document sub-types returned from the above classifier object 86 until a certainty value is either discarded from or stored for further consideration.

Once all document sub-type objects 82 within the set are analyzed, document identification module 40 may compare the certainty values associated with the remaining document sub-type objects 82 to each other and identify the best certainty value, e.g., by selecting the highest certainty value, thereby ending its traversal of document identification framework 34. Document identification module 40 may transmit this identified certainty value as well as the associated document type object 78 or sub-type object 82 to user interface 28 for display via display 43. The user may be required to approve this identified document type object 78 or sub-type object 82 or otherwise acknowledge that document identification module 40 correctly identified security document 12 from analysis of the captured image(s).

Figure 6:
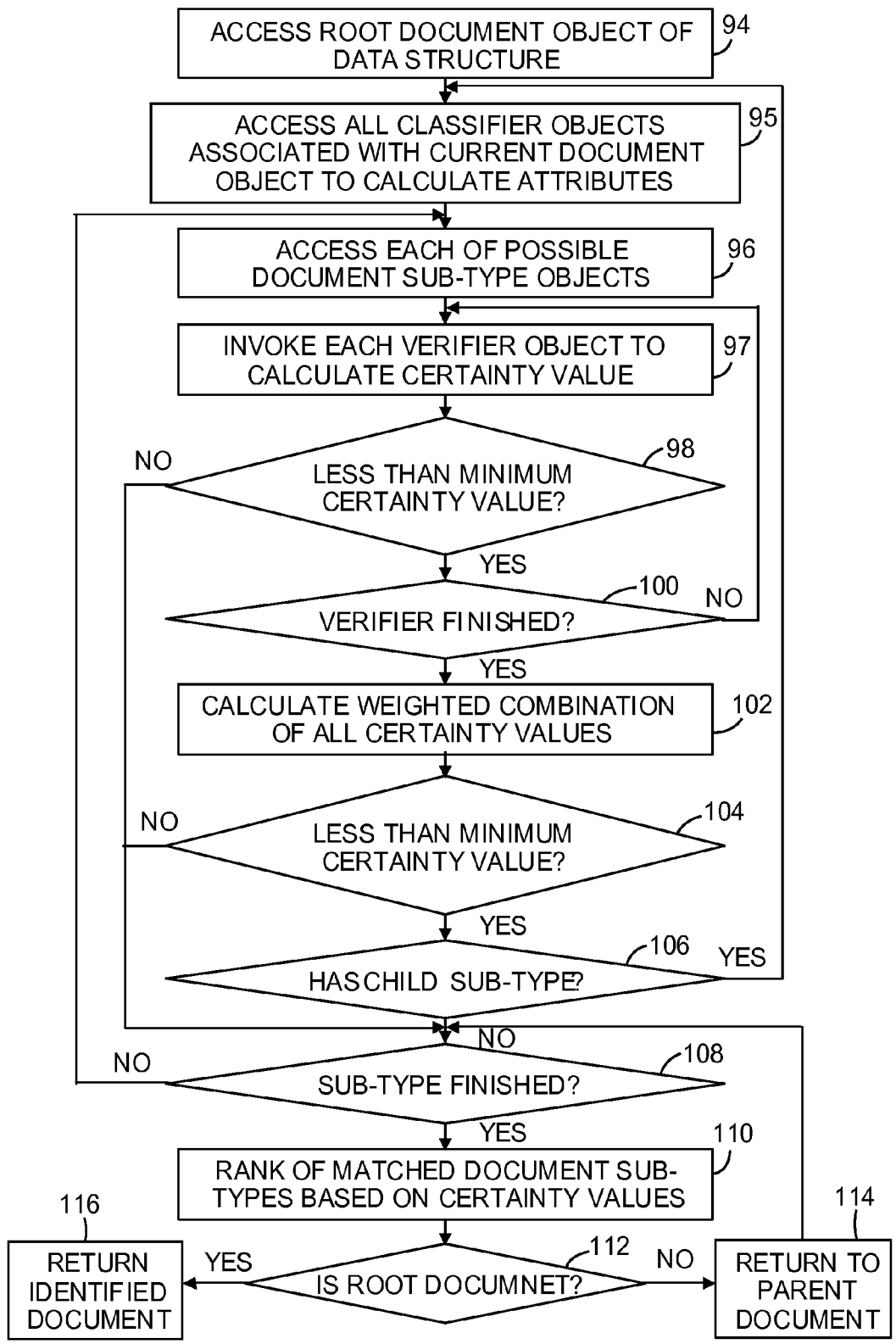
FIG. 6 is a flowchart illustrating example operation of a document identification module in traversing document identification framework.

FIG. 6 is a flowchart illustrating example operation of document identification module 40 of FIG. 2 in traversing document identification framework 34 recursively, as shown in FIG. 5, according to the dynamic traversal method. Although described below in reference to the dynamic traversal method, document identification module 40 may traverse document identification framework 34 according to any of the other methods, or combinations thereof, including traversing document identification framework 34 according to references to document type objects 78 stored in queue data structure 46, according to priorities 88, and any combination of these methods.

Initially, document identification module 40 receives the captured image(s) of security document 12 along with optionally other data (e.g., RFID data) and accesses root object 80 of document identification framework 34 to begin traversing document identification module 40 and treat the root object as the current processing document (94). Document identification module 40 may, for example, access classifier object 86A associated with the current document, thereby invoking one or more of the plurality of classifiers 47 referenced by classifier object 86A, i.e., the classifier processes (95). In response to the invocations, document identification module 40 calculates a set of possible attributes or characteristics. From this document type object at this node, document identification module 40 may receive a set of possible document sub-type objects, and this set generally comprises one or more of document sub-type objects 78 (96). For example, one exemplary set of possible document type objects may include document type object 78A and 78M. Given this set of possible document type objects, i.e., the "sub-type set," document identification module 40 continues to traverse document identification framework 34 according to the type set (96).

Document identification module 40 traverses down one level of document identification framework 34 by accessing the first document type object 78A returned in the type set and its associated classifier object 86. If any verifier for document type object 78A confirms the attributes extracted by classifier object 86 (or if no verifier object exists, as in this example) then document identification framework 34 now treats document type object 78A as the current document and calculates an additional set of possible attributes or features using classifier object 86A (95). Then, document identification module 40 traverses down one more level to check each of its child sub-documents 82A-82D, i.e., the "sub-type set" (96). Document identification module 40 next traverses document identification framework 34 according to this new sub-type set (96).

Document identification module 40 traverses down document identification framework 34 by accessing the first document sub-type object 82A returned in the sub-type set and its associated verifier object 90A. Document identification module 40 invokes one or more verifiers 48 referenced by the associated verification object 90A as well as one or more validators 49 referenced by validator object 92A (since this is a leaf node) and receives a set of certainty values (97). In determining the certainty value, verifiers 48 may access associated template data 91A. The certainty value reflects the level of similarity with respect to the analysis performed on the captured image(s), as compared to associated template data 91A, by one pair of the invoked classifiers 47 and verifiers 48. For example, a certainty value of 100 may reflect a perfect match between associated template data 91A and the captured image(s) while a certainty value of 80 may reflect an adequate match between associated template data 91A and the captured image(s) but may indicate that one or more characteristics of the captured image do not perfectly match associated template data 91, and zero means totally no match. In some embodiments, document identification module 40 compares each certainty value returned by invoked verifiers 48 to a minimum certainty value 92A and stops checking this sub-document or the whole branch starting from this node upon failure (98), or set the combination certainty value for the sub-document as zero. In other embodiments, document identification module 40 calculates a combination certainty value for this sub-document with the captured image(s) as the weighted average of all certainty values returned from all invocations of verifiers 48 (102) and compares this weighted average to minimum certainty value 92A, storing only those weighted average certainty values that exceed minimum certainty value 92A (104).

If this sub-document is confirmed satisfying the minimum certainty value, it's checked whether the node is a branch node in the document tree and has child sub-document, i.e., a parent node (106). If it has some child sub-documents attached under itself, this sub-document is treated as the current document and the document identification module traverses down one more level of the document tree by repeating the process described above (95). This is implemented as a recursively depth-first way to travel down the whole document tree until reaching a leaf node.

Once finished with one document sub-type object 82 within the sub-type set, document identification module 40 may determine whether it has finished iterating through the sub-type set (108). If not finished iterating through the sub-type set, document identification module 40 continues to iterate through the sub-type set by accessing another document sub-type object 82, invoking verifiers 48 referenced by its associated verifier object 90, receiving a certainty value, and storing the certainty value based on the comparison (96-108). If finished, document identification module 40 ranks all the sub-documents by the calculated associated certainty values to complete the cycle of path selection processing at a give document node (110). The next step determines where to return the results depending on the current processing document is a root document or has a parent document type (112). If it's a child sub-document, the control is popped up one level of the document tree and returned to its parent document (114), and the certainty value of the child sub-document is merged with the parent document. Otherwise, document identification module 40 has finished iterating through the whole document tree, document identification module 40 identifies the captured image(s) based on the stored certainty values (116). Document identification module 40 may compare all stored certainty values to one another and select the highest certainty level, thereby identifying the captured image(s) as belonging to document sub-type object 82 associated with the highest certainty value.

Operation of document identification module 40 in traversing document identification framework 34 has been described above. Document identification framework 34 stores document type objects 78 and document sub-type objects 82 via a dynamic document identification framework. The framework is "dynamic" in that that the order of traversal varies depending on the attributes and characteristics of the security document, and that the framework facilitates updates, deletions, and insertions of document type and sub-type objects 78, 80 respectively via layout editor 30. Dynamic document identification framework provides the protocol by which these dynamic updates, deletions and insertions may occur, thereby maintaining a flexible and extensible framework by which to identify security document 12. The framework is flexible in that many different types of articles may be identified, including United States and foreign passports, United States and foreign driver licenses, United States and foreign identification cards, and commercial papers. The framework is extensible in that one or more document type, including sub-types of the document type, may be quickly added to the framework and inserted into document identification framework 34, as described in more detail below.

Figure 7A:
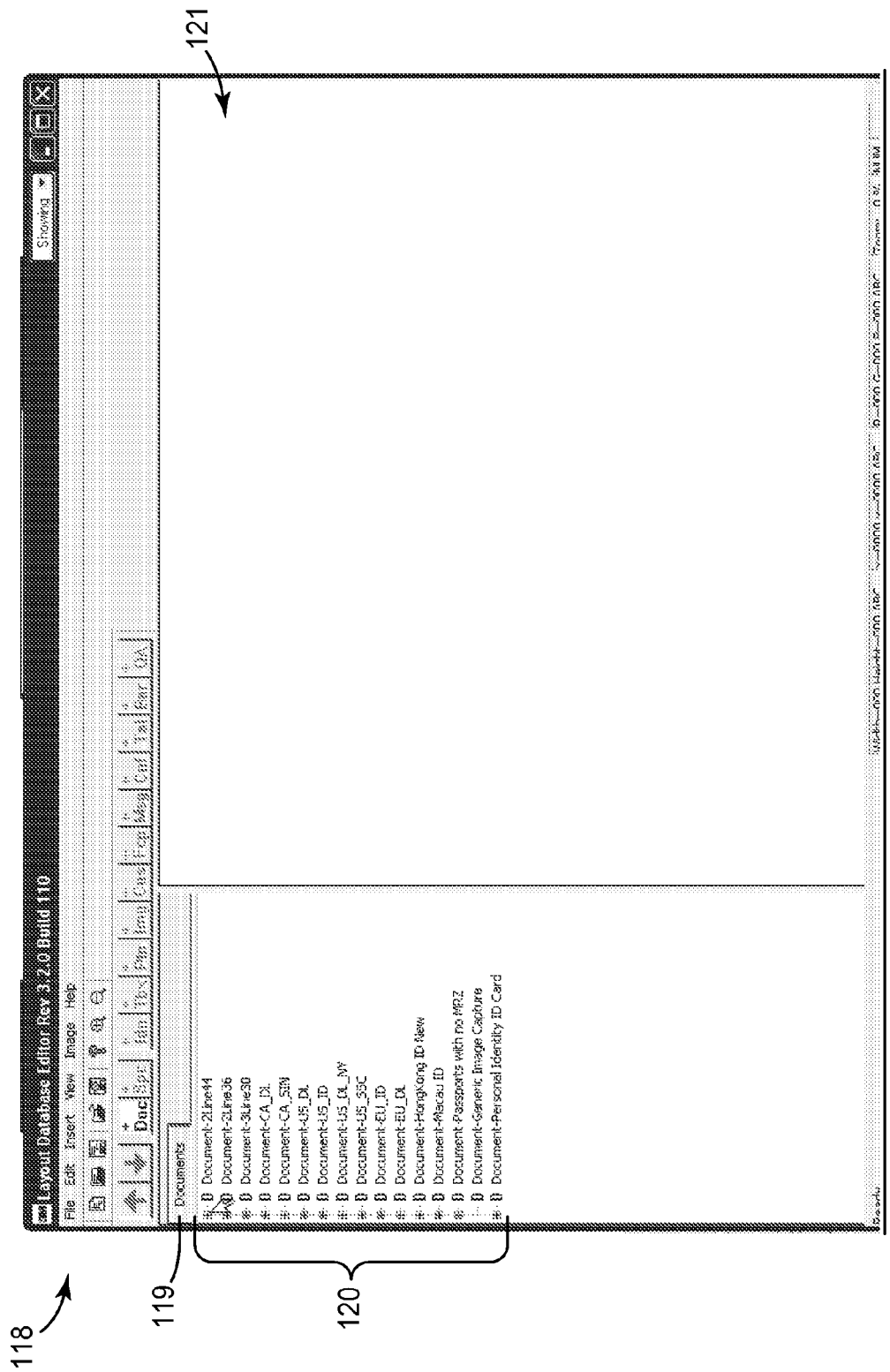
FIGS. 7A-7C are screen shots of a window presented by a user interface for the document identification framework to a user via a display.
Figure 7B:
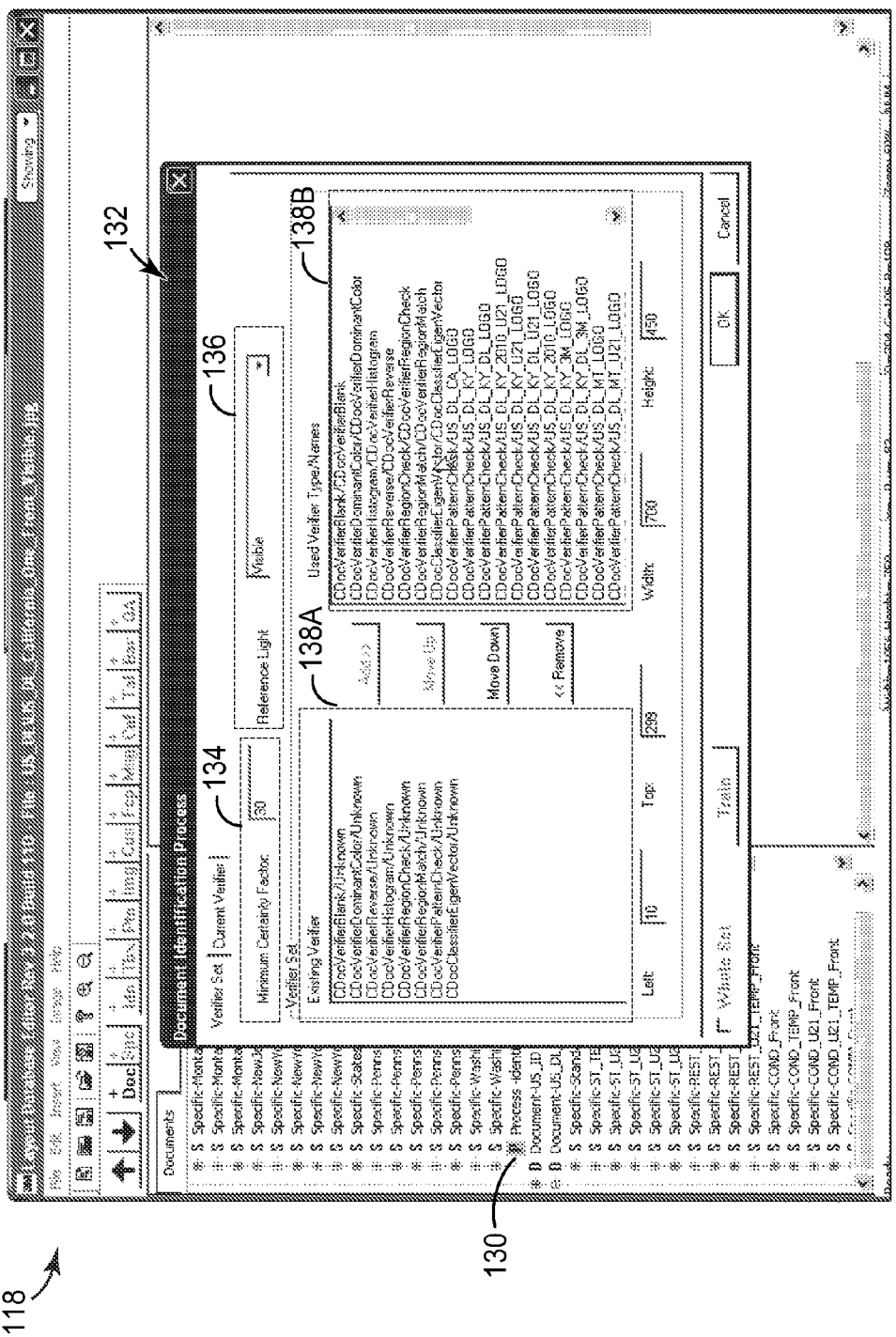
Figure 7C:
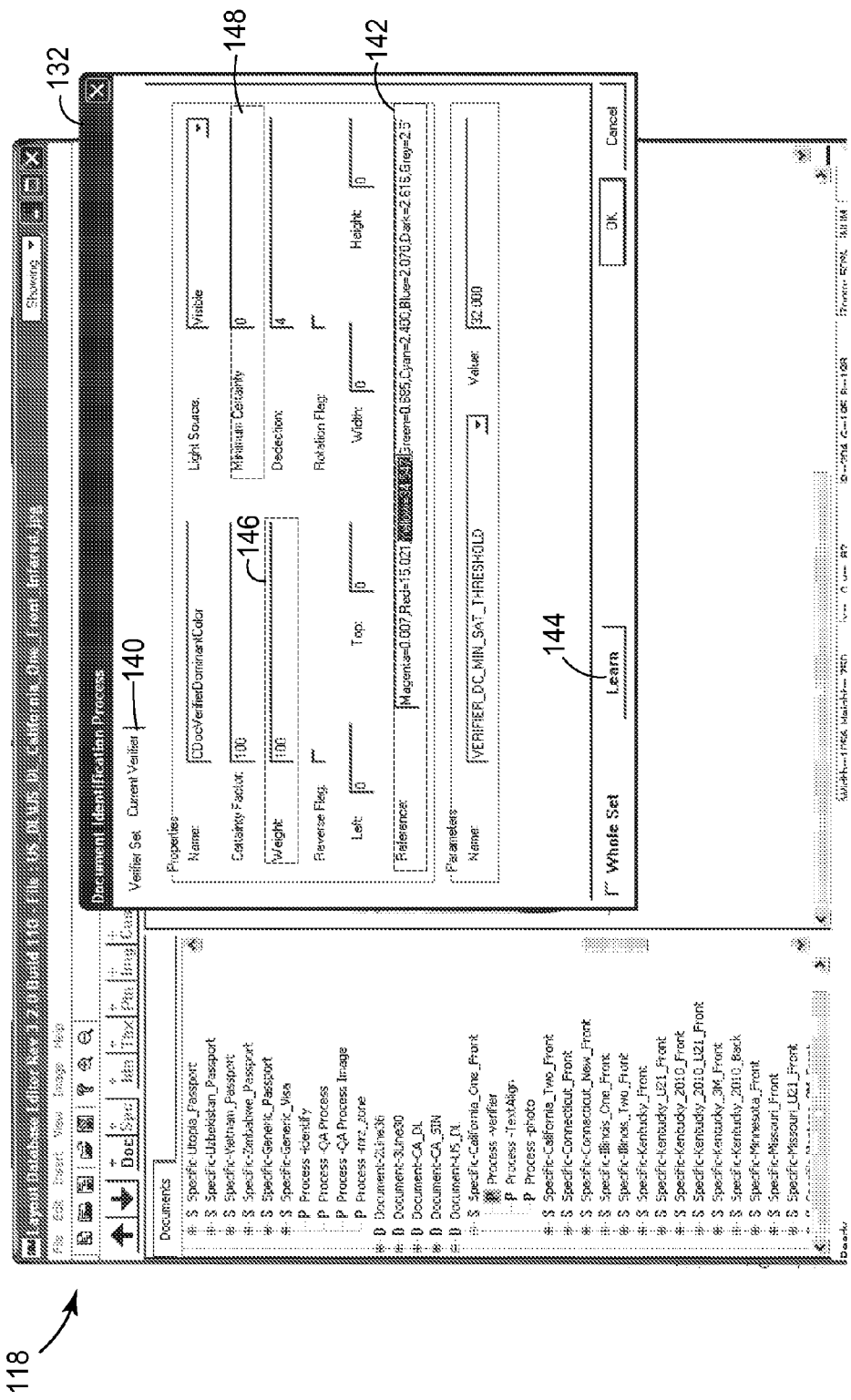

FIGS. 7A-7C are screen shots of a window 118 presented by layout editor 30 to a user via display 43. Screen 118 includes a document tab 119, an identification framework 34 represented as an expandable list of document type objects 120, and a view sub-window 121. Document type object list 120 comprises one or more text areas each referencing one of the plurality of document type objects 78 of FIG. 5. For example, document type object 78A may comprise the "Document-2Line44" document type, as shown in FIG. 7A as the first item on list 120. Thus, document type object list 120 shows an example organizational hierarchy that may be defined by document identification framework 34. View sub-window 121 typically shows any relevant templates data 91 stored to database 32 and associated with a selected one of the items in document type object list 120.

FIG. 7B shows window 118 after a user has selected item 130 of the identification processes for this document type. In response to this selection, layout editor 30 overlays pop-up window 132 over window 118, where pop-up window 132 allows the user to edit one of verifier objects 90 associated with item 130 to define the identification process for a type of document. In this example, pop-up window 132 includes a minimum certainty value input 134, a lighting source selection input 136, an existing verifier process selection box 138A, and a used verifier process selection box 138B. The user may associate a minimum certainty value with this type of document, such as minimum certainty value 92A associates with document sub-type object 82A in FIG. 5, through interaction with minimum certainty input 134. The user may also specify a reference light, such as visible light, UV light, and infrared light, to use when capturing the image of security document 12 via light selection input 136. The user may also edit verifiers 48 currently referenced by one of verifier objects 90A via existing verifier process selection box 138. Finally, the user may associate or remove additional verifiers 48 to verifier object 90A under review by the user via used verifier process selection box 138B.

FIG. 7C shows window 118 overlaid by pop-up window 132 after the user selects current verifier tab 140 to configure a particular application of one of classifiers 47 or verifiers 48. As shown in FIG. 7C, the user is currently editing the "CDocVerifierDominantColor" process, which analyzes the dominant color of the captured image and compares the analysis against the reference specified within reference input 142. Pop-up window 132 includes reference input 142 so that the user may edit these references manually. For example, the dominant color process compares the analysis of the captured image against a range of colors defined in reference input 142, which specifies a magenta color percentage of 0.007, a red color percentage of 15.021, a yellow color percentage of 34.547, etc. The user may edit these individual color percentages (as shown by the blue highlighted area) manually, or alternatively, the user may select learn button 144 and layout editor 30 will learn these references from a template image scanned into the system previously or contemporaneously, if the user has the physical template ready for scanning.

Pop-up window 132 also includes a weight input 146 and a specific minimum certainty input 148. The user may enter a weight value into weight input 146 such that upon calculating the weighted average of several invoked verifiers 48, document identification module 40 uses this specified weight value in calculating the weighted average. Similarly, the user may input a specific minimum certainty into input 148 for use during traversal, as described above in step 98 of FIG. 6. In this manner, a user may dynamically configure classifiers 47 and verifiers 48, associate the classifiers 47 and verifiers 48 with particular objects 86, 90, and dynamically modify traversal of framework 34 by configuring the weights and minimum certainty values.

Figure 8A:
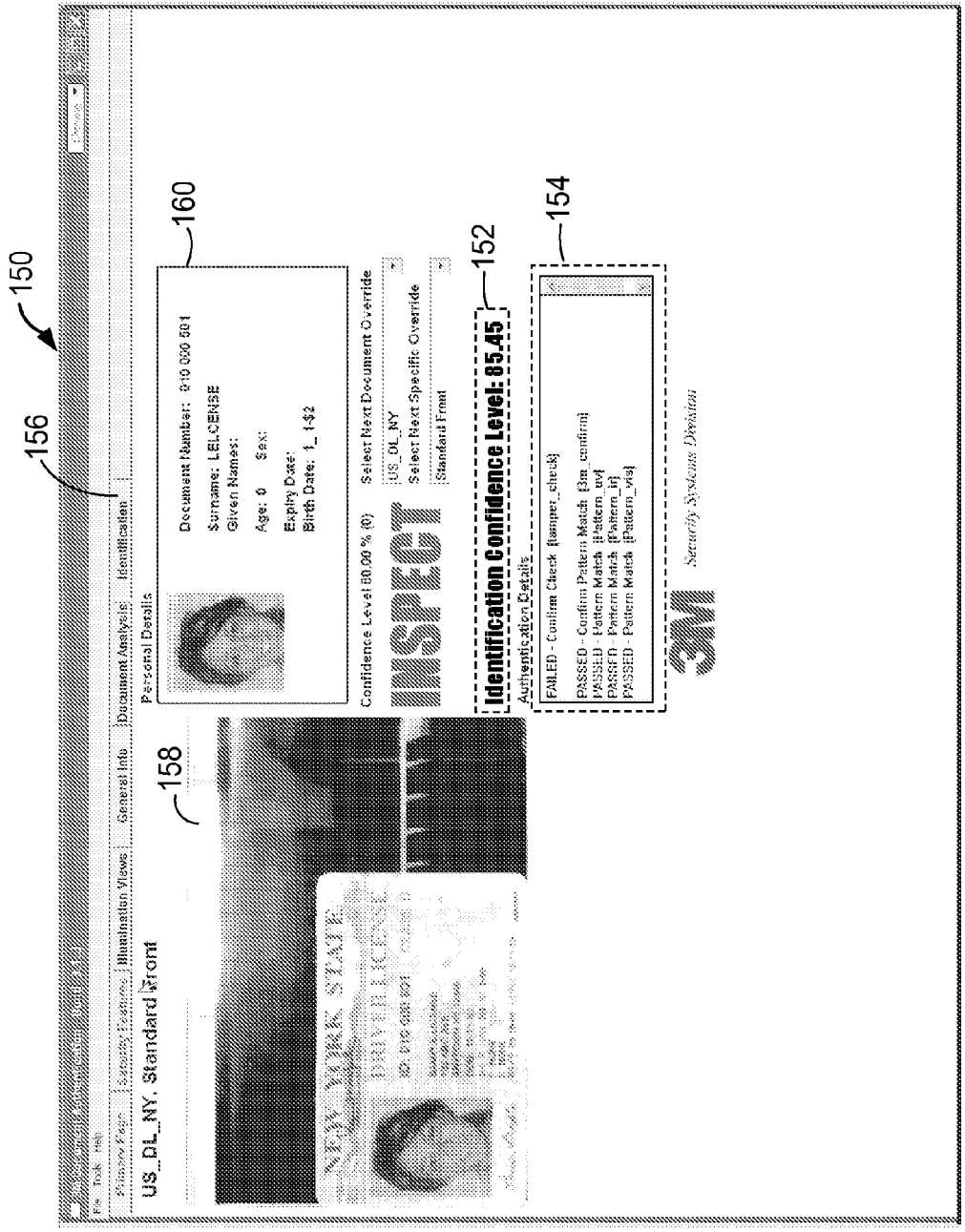
FIG. 8A, 8B are screenshots of a window presented by a user interface to a user via a display after a host system completes both identification and subsequent validation.
Figure 8B:
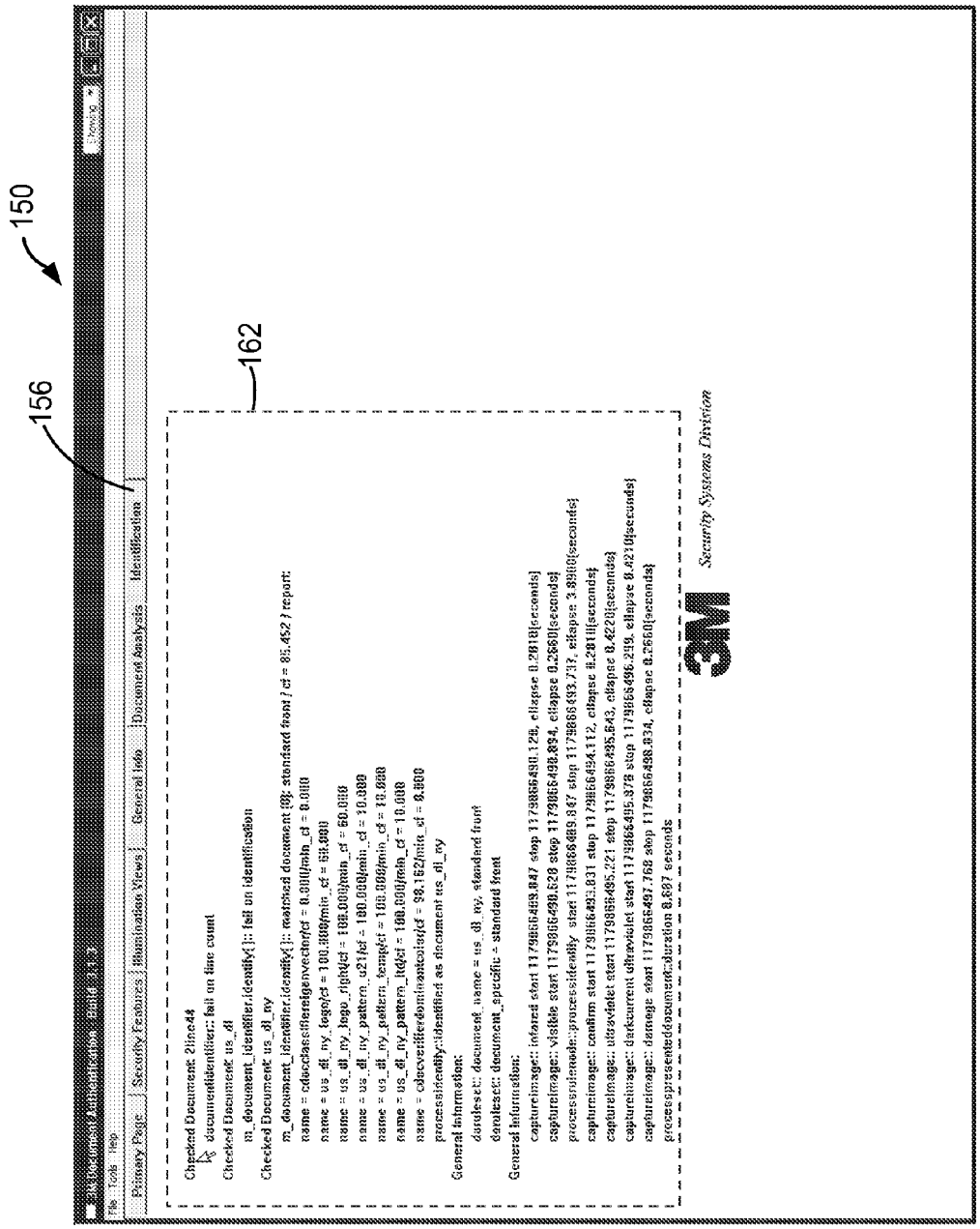

FIG. 8A, 8B are screenshots of a window 150 presented by a demonstration user interface 28 of FIG. 2 to a user via display 43 after host system 20 completes both identification and subsequent authentication. This document is identified as the front side of the current standard version of New York drive license of United States. Window 150 includes an identification confidence level text output 152, which typically represents the weighted certainty value calculated by document identification module 40 during identification process. Window 150 also includes authentication detail output 154 that shows the result of authentication and identification tab 156 that upon being selected presents the results of the identification process. Window 150 also presents other pertinent information, such as captured image 158 and security document details 160 glossed from an analysis of captured image 158.

FIG. 8B shows window 150 after the user selects identification tab 156. User interface 28 presents within window 150 text output 162 that shows the result of dynamically traversing document identification framework 34. Starting at the top of text output 162, document identification module 40 first traversed to one of document type objects 78 labeled "2line44" and accessed its associated classifier object 86, whereupon document identification module 40 invoked the referenced classifier classifiers 47. The result returned no available document sub-type objects 82, as the test failed on "line count" (as shown in the second line of text output 162).

Next, document identification module 40 traversed to document type object 82 labeled "us_dl" (as shown in the third line of text output 162), however, according to the fourth line of text output 162, the associated classifier object 86 failed again "on identification" for a general United States driver's license. Finally, upon traversing to document type object 78 labeled "us_dl_ny," document identification module 40 found a match (as shown in the sixth line of text output 162) and received a set of document sub-type objects. Traversing this sub-type set, document identification module 40 invoked the referenced classifiers 47 and verifiers 48 shown in lines 7-13 that each returned a "cf" value. The "cf" value reflects the certainty value determined by each verifier and the "min_cf" value shows the minimum certainty value required to pass each verifier. Line 6 of text output 162 shows the result of comparing the weighted average of the proceeding "cf" values, or certainty values by confirming that the captured image(s) was "identified as document [type object] us_dl_ny in Line 14," and "specific [sub-type object] standard front version]".

Figure 9:
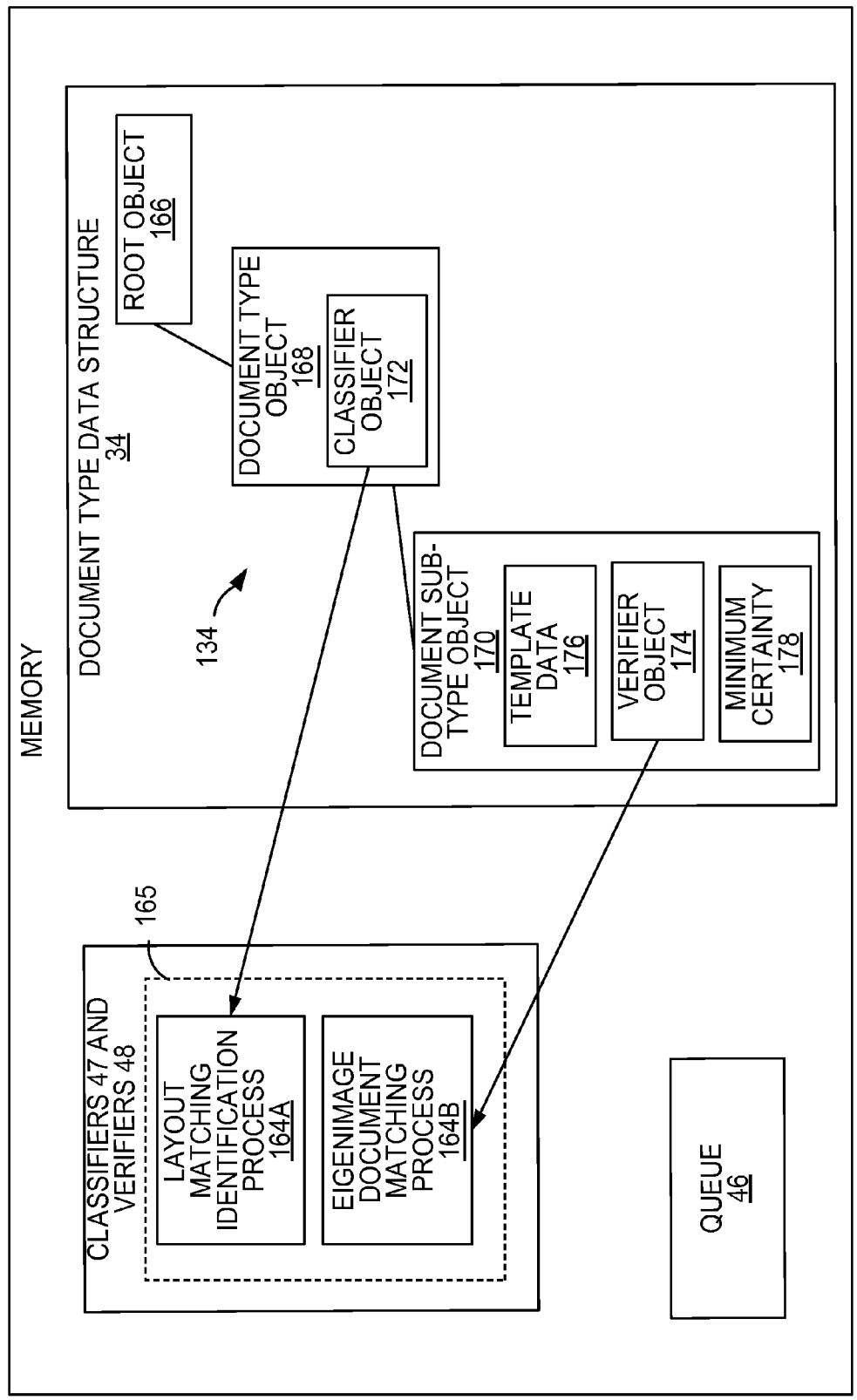
FIG. 9 is a block diagram illustrating a portion of a memory structure of the host system of FIG. 2 in more detail.

FIG. 9 is a block diagram illustrating a portion of a memory structure of host system 20 of FIG. 2 in more detail. In this limited example, classifiers 47 and verifiers 48 include layout matching process 164A and Eigenimage document matching process 164B. As further shown in FIG. 9, document data structure 34 includes root object 166, document type object 168, and document sub-type object 170. Document type object 168 includes classifier object 172, and document sub-type object 170 includes verifier object 174, template data 176, and minimum certainty value 178. Each of objects 168-174, template data 176, and minimum certainty value 178 may be substantially similar to those objects discussed in reference to FIG. 5. Document identification framework 34 may include multiples of each of objects 168-174, template data 176, and minimum certainty value 178, and this classification structure could also be recursively repeated into multiple layers, but for ease of illustration, these additional objects are not shown in FIG. 9.

As two of the general purpose identification methods deployed in the document identification module 40, the layout matching process 164A and Eigenimage document matching process are very efficient in narrowing down the possible candidates. These two methods are also very easy to be configured for identifying a document. They are discussed in detail below. The document identification module 40 is not limited only by these two methods and provides a flexible programming structure to incorporate new methods. Some other commonly useable identification methods include document size, dominant colors, blankness, grey histogram, OCR result of text and barcode, template matching and etc.

Figure 10:
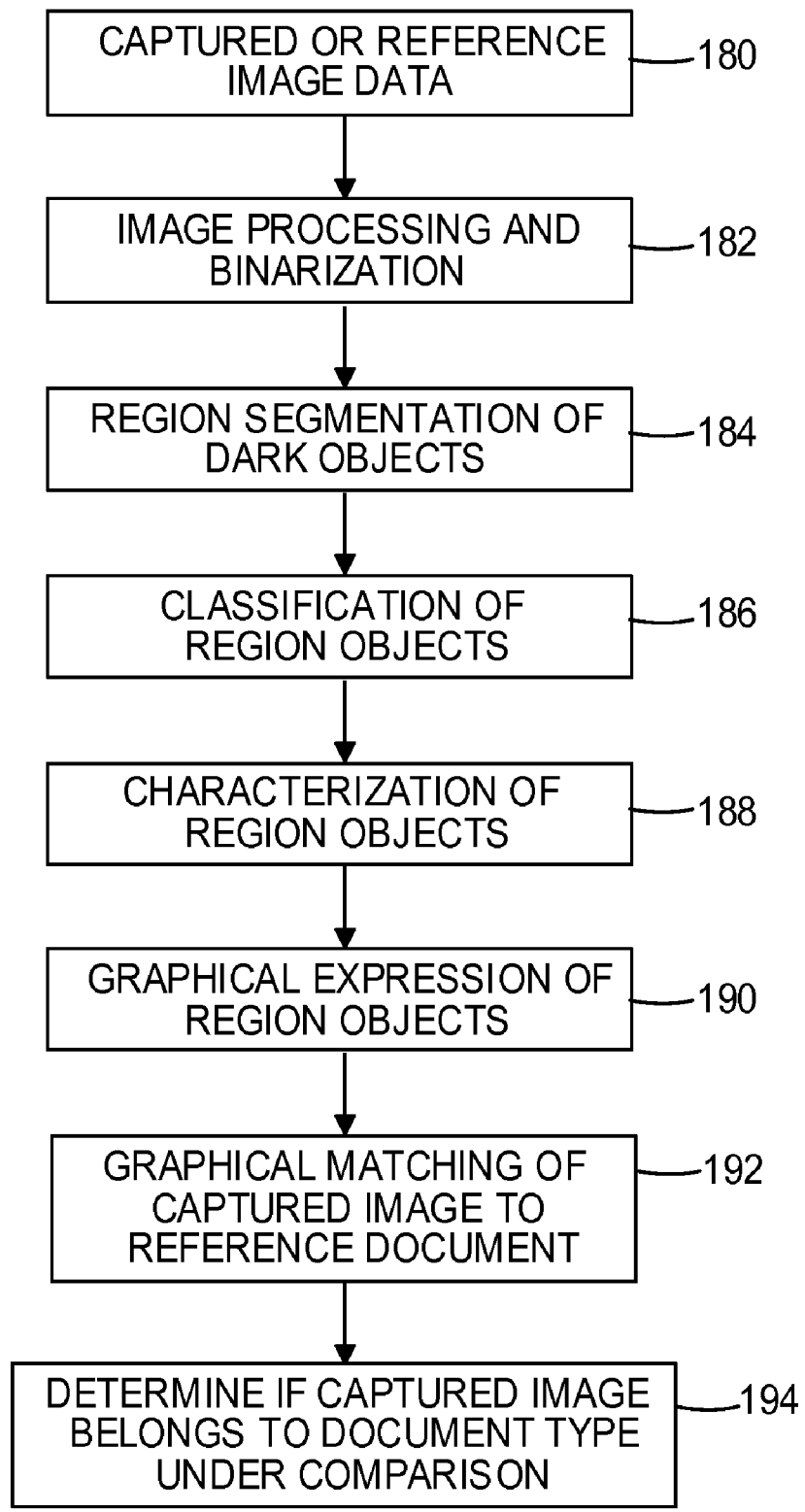
FIG. 10 is a flowchart illustrating example operation of a document identification module in traversing a document identification framework to invoke a layout matching identification process.

FIG. 10 is a flowchart illustrating processing steps employed in one of document identification module 40 of FIG. 2, in traversing document identification framework 34 to invoke a layout matching process 164A of FIG. 9. This sequence of processing steps could be applied on the reference image data to build the document template or the captured live image data to identify the document type (180). The document reference template data could be manually modified by the layout editor 30 as discussed above. Document layout could be analyzed by segmentation and classification of connected dark regions in light background or in reversed, in an image or a plane of grey or color image under a certain lighting source.

Upon invoking layout matching process 164A, document identification module 40 executes layout matching process 164A to determine a possible set of document sub-type objects, i.e., sub-type set. First, after some image quality enhancement, the image is thresholded into binary (182), and then is segmented into a plurality of regions based on the connectivity of the dark pixels (184). Next, the isolated regions are classified by some features into some categories, such as text, barcode, photo, magnetic stripe, fingerprint and etc. (186), and then each region is characterized by some additional information, such as the size, position and direction (188). Region reference should better be the center in most of cases, such as barcode, photo, magnet stripe and static text. But sometimes for variable region, such as the dynamic text of names and addresses, the left side of the region has to be used. A document is represented in a tree structure of region objects with the type and other characteristics (190), region objects could be grouped by the area into a hierarchy structure in the reference template expression, that may be more meaningful for human. While the position of the document or its content could change due to printing offset, displacement of document in scan, or other reasons, the relative position of region objects play a more strict constraint in determining a document type, but the image shift or rotation is limited in the application environment of reader scanning. Once the distinct image regions are graphically represented and connected for the captured image, document identification module 40 may further compare the plurality of connected regions to template data, such as template data 176 of FIG. 9, associated with one of the plurality of document type objects stored to the database (192). Generally, template data 176 defines a pre-defined plurality of connected image regions and relationships between the plurality of pre-defined connected image regions, and document identification module 40 compares the determined connected regions and relationships to those pre-defined connected regions and relationships. Finally, based on the comparison, document identification module 40 determines whether the captured image(s) belongs to the one of the plurality of document type objects currently under comparison, i.e., document type object 178 (194), by a unified similarity certainty value (97), for example, 0 to 100.

Figure 11A:
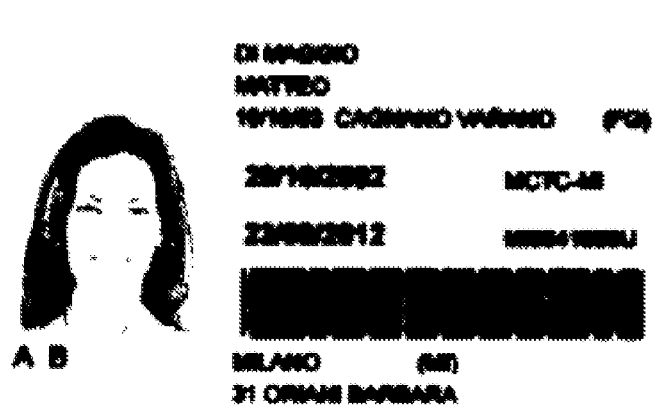
FIGS. 11A-11C are exemplary images illustrating the state of the captured image as a document identification module executes a layout matching identification process.
Figure 11B:
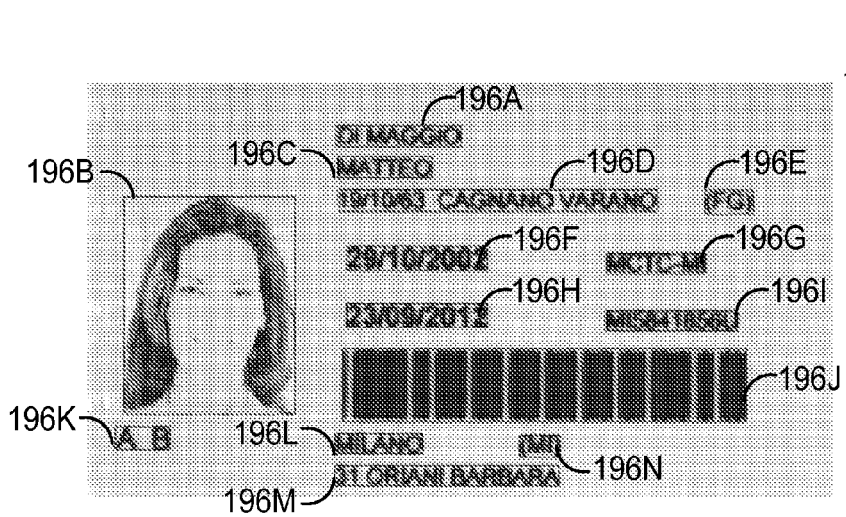
Figure 11C:
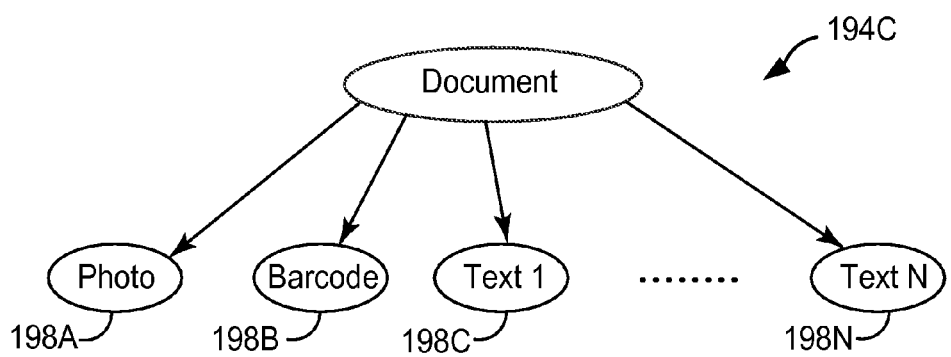

FIGS. 11A-11C are exemplary images illustrating the state of the captured image as document identification module 40 of FIG. 2, executes a layout matching process 164A of FIG. 9. FIG. 11A shows captured image 194A after it has undergone image processing and binarization (182). Although not required to implement layout matching process 164A, the results of applying layout matching process 164A may be greatly enhanced by performing such image processing. FIG. 11B shows captured image 194B after it has undergone document segmentation (184). Document identification module 40, executing in accordance with layout matching process 164A, segments captured image 194B into a plurality of connected regions 196A-196N. FIG. 11C shows graphic representation 194C of the captured image, where each of the plurality of connected regions 196A-196N maps to one of nodes 198A-198N (190). Each of nodes 198A-198N may also specify relationships between other nodes.

Once the captured image is graphically represented, document identification module 40 may compare this graphical representation 194C to template data, such as template data 176 of FIG. 9. Document identification module 40, in accordance with layout matching process 164A, may perform one or more different comparisons. For example, document identification module 40 may simply compare the presence of same type of regions in graphical representation 194C to the presence of regions in template data 176. Alternatively or in addition to this region type comparison, document identification module 40 may compare graphical representation 194C to a graphical representation stored within template data 176 by some additional constraints, such as size and position, or more strictly the space relationship of the regions. This kind of graphical comparison could be fast implemented by such as Inexact Graphic Matching by Dynamic Programming algorithm. In some instances of graphical representation comparisons, document identification module 40 may imply limits on the comparison specified to the environment of image capture device 11 and document type 12 in FIG. 1, such as a limited translation and rotation limitation, a masked matching limitation, a missing or extra region limitation, a dynamic content limitation, and an inexact segmentation and printing misplacement limitation. Applying one or more of these limitations may significantly decrease the time necessary to perform layout matching identification process 164A.

The limited translation and rotational limitation limits how much the regions or overall document may be rotated before undergoing a comparison. The masked matching limitation may filter some regions of a particular document out to reduce the number of comparisons necessary. The missing or extra region limitation may stop comparison for missing, merged, or extra regions caused by the customized printing or bad image processing on poor or noisy images within the captured image. The dynamic content limitation may reduce the number of relationships that need be measured for regions containing dynamic content, such as name and address text regions. The inexact segmentation and printing misplacement limitation may combine two or more text regions that were incorrectly segmented, thereby decreasing the number of regions that undergo comparison.

Figure 12:
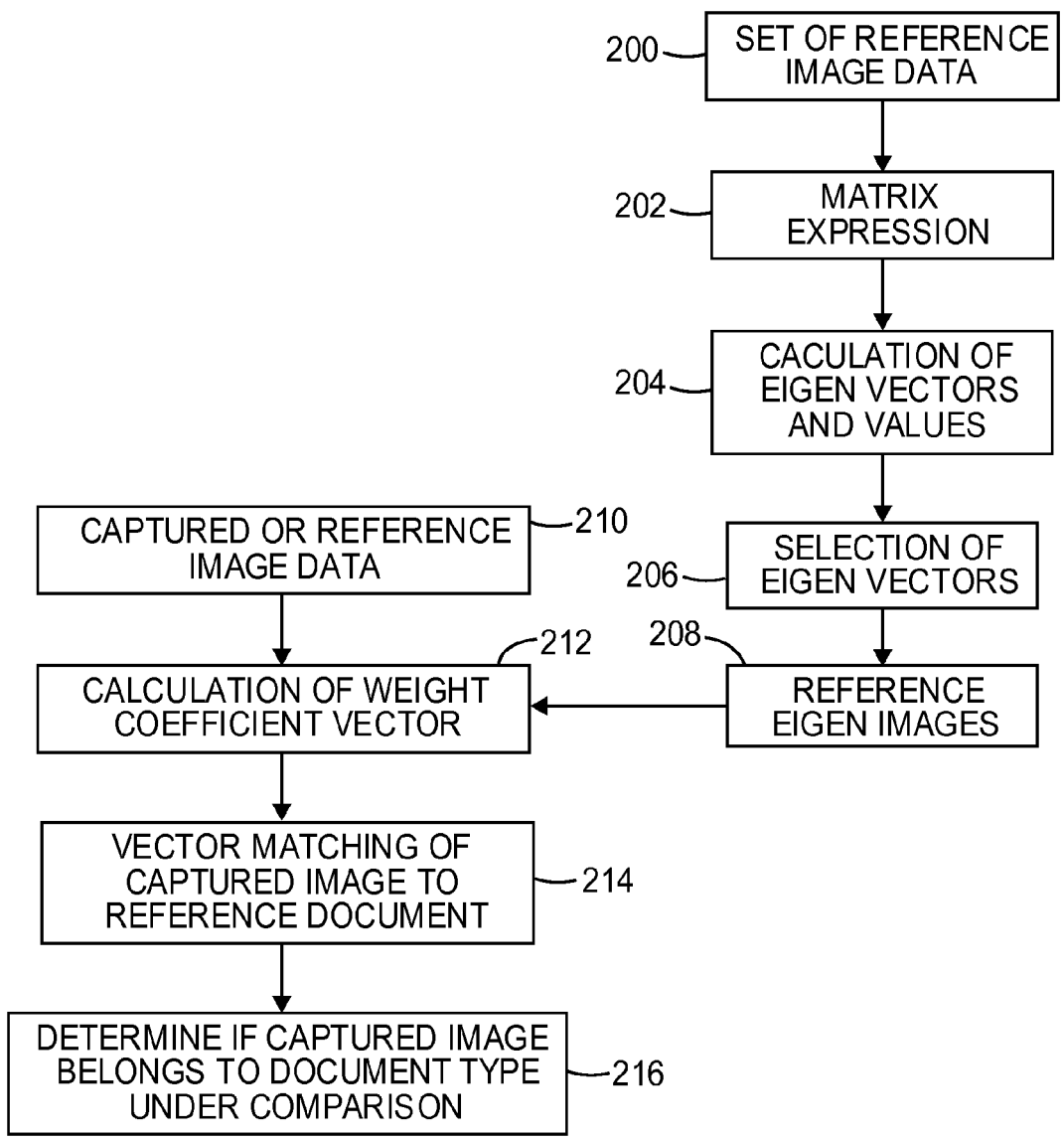
FIG. 12 is a flowchart illustrating example operation of a document identification module in traversing a document identification framework to invoke an Eigenimage document matching process.

On the right side of FIG. 12 is a flowchart illustrating operation steps of training the eigenimage classifier 47 by the layout editor 30 (200-208). As an information compression scheme, known also as PCA (Principal Component Analysis), the Eigenimage method may effectively reduce the expression complexity of a large collection of images to a few orthonormal eigenimages, so as to achieve fast object recognition and other tasks. The region of interest could be the whole document area or a part that better excludes the dynamic content. In addition, pre-processing of the document may be used to reduce the influence of any dynamic content.

In any case, the first step is to collect all possible or selectively typical image templates (200). Template data for the collected image templates may be normalized as zero-mean. Next, a data matrix is formed in which each column stores image data for a different image template (202). Each of the entries within each column may represent the same partial or all image region of an image template. A set of Eigen vectors are calculated by the covariance matrix of this data matrix and sorted by respective Eigen values (204). The Eigen vectors may be calculated from the data matrix from the original image data from the template, or reduced to a lower dimensionality by the transpose of this data matrix; both techniques produce mathematically equivalent results. A threshold may be used to select only those Eigen vectors having sufficiently large Eigen values, i.e., Eigen values that exceed a pre-defined threshold (206). As one example, a cut-off may be applied so only Eigen values that are within 10% of the maximum Eigen value are selected. Each of these selected Eigen vectors may be mapped back as a respective Eigen image as if they were calculated from the transposed data matrix and stored. The process described above can be viewed as a mathematically simplifying process in that the original image typically has a very high dimensionality and is reduced to a lower dimensionality to find the orthonormal Eigen vector much faster. This Eigen vector is then mapped back to the higher dimensionality of the original image. The final expression in Eigen image form may be easier to ultimately apply the captured image, as described below. This set of selected orthonormal eigen images may be viewed as best expressing the original set of template image data in the meaning of least square error.

On the left side of FIG. 12 is a flowchart illustrating operation steps of a document identification module 40 of FIG. 2, in traversing document identification framework 34 to invoke Eigenimage document matching process 164B of FIG. 9 (210-216). This sequence of processing steps could be applied: (i) on the reference image data to build the document templates and pre-compute reference weight coefficient vectors for each document sub-type objects stored in the database, or (ii) to the captured image data to identify the document type (210).

Upon invoking Eigenimage document matching process 164B, document identification module 40 executes Eigenimage document matching process 164B to calculate a weight coefficient vector of the captured image (212) expressed by the above-selected orthonormal Eigen images. This is done by multiplying the captured image data vector (or reference image data) onto a data matrix constructed by the selected orthonormal Eigen images to produce the weight coefficient vector for the captured image. That is, each column of the data matrix represents one of the Eigen images, and multiplication by the captured image data vector produces a vector of coefficients, where each coefficient represents an expression of the captured image in the multiple dimensional space formed by the othonormal Eigen images. Next, document identification module 40 compares the weight coefficient vector of captured image data with each pre-computed reference weight coefficient vector associated with one of the plurality of document sub-type objects stored in the database, i.e., each possible reference document type (214). This calculates a distance or similarity of two vectors with respect to the weight coefficient vector for the captured image and the pre-computed reference weight coefficient vectors. Typically, document identification module 40 may calculate this distance according to one of the following four standard distance calculation algorithms: 1) Euclid distance, 2) Hamming distance, 3) NCC (Normalized Cross Correlation), and 4) Mahanalobis distance. Based on the distances, document identification module 40, in accordance with Eigenimage document matching process 164B, determines whether the article belongs to the one of the plurality of document sub-type objects currently under comparison, i.e., document sub-type object 170 (216), and the classification is commonly based on the nearest neighborhood (NN). The determination may come in the form of a certainty value for each possible reference document type object that represents the distance on a unified scale of, for example, 0 to 100. In this way, the certainty value represents whether the distance between the weight coefficient vector of the captured image and the respective weight coefficient vector for each of the possible reference documents is less than a predefined threshold.

Figure 13A:
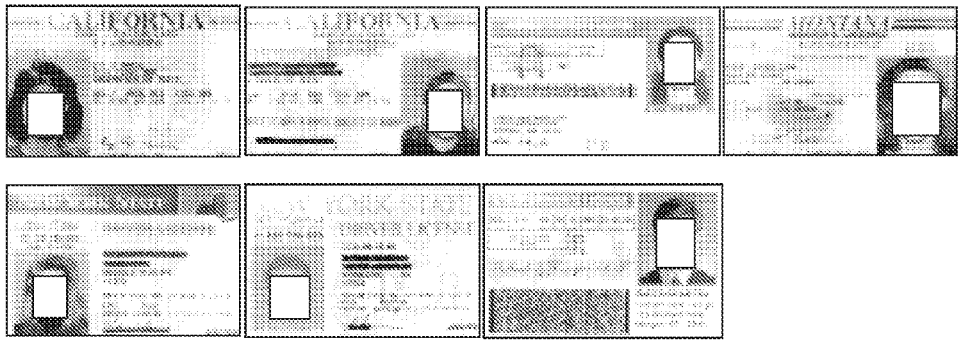
FIGS. 13A-13C are exemplary images illustrating the state of a captured image as a document identification module executes an Eigenimage document matching process.
Figure 13B:
Figure 13C:
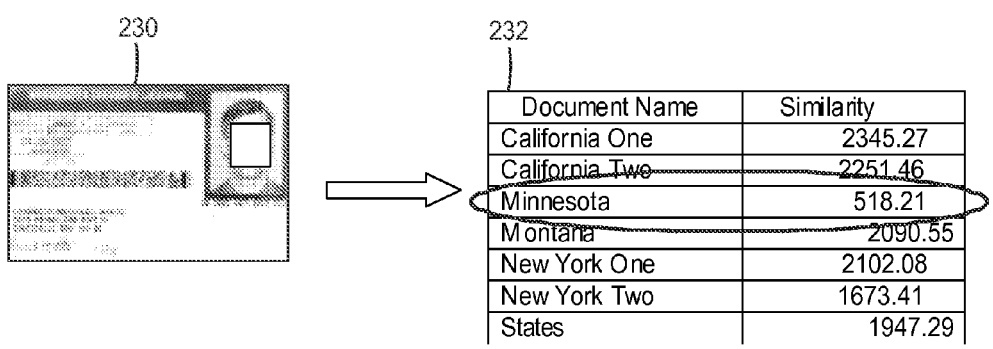

FIGS. 13A-13C are exemplary images illustrating the state of captured image 230 of FIG. 13C as a document identification module, such as document identification module 40 of FIG. 2, executes an Eigenimage document matching process, such as Eigenimage document matching process 164B of FIG. 9. FIG. 13A and FIG. 13B show exemplary training images and results used before identifying this document. FIG. 13A shows a set of seven samples of United States driver licenses: two types from California and New York, one from Minnesota, Montana and States. In real application, this set of template images may approach hundreds of images or more. The layout editor 30 calculates their eigen images and values that are shown in FIG. 13B. This set of seven eigen images could be selected using only part of them with higher eigen values to approximately express the original seven template images. Then, each of the seven template images of FIG. 13A is multiplied onto the matrix constructed by the selected eigen images producing a reference weight coefficient vector as the template data for this document sub-type, which is stored in the database 32.

Once upon a newly captured image 230 of FIG. 13C, document identification module 40 invokes Eigenimage document matching process 164B of FIG. 9, the image data is multiplied onto the same above matrix constructed by the selected eigen images to produce a weight coefficient vector. The Eigenimage document matching process compares this new weight coefficient vector with each of pre-computed reference weight coefficient vectors associated with the plurality of document sub-type objects currently under comparison, i.e. the seven US driver licenses of FIG. 13A used for training. For example, document identification module 40 may determine the distance between the newly captured image data to seven template image data using the Hamming distance calculating algorithm or other algorithm to produce exemplary results 232 shown in FIG. 13C.

Results 232 for the newly captured image data shows a shortest distance of 518.21 from the template data associated with the document sub-type object of Minnesota in the multidimensional space determined by the selected eigen images in accordance to the Hamming distance algorithm. This relatively much smaller distance than the ones associated with other six document sub-type objects represents a better match in the document classification based on the nearest neighborhood (NN).

The next step for proving the authenticity by document processing engine 36 of FIG. 2 after identifying a particular document type by document identification module 40 is to invoke document authentication module 42 to confirm whether required features are present. In practice, the authentication feature is an exchangeable concept with the identification feature discussed above, that means an image analysis method may be applied in the implementation of validator, verifier or even classifier. The basic guideline is using as few as possible features for the identification in the shortest time with lower rejection rate of correct document type, and the others for the so-called authentication process invoked only from identified document with lower false acceptance rate of forgery.

Three methods are presented here as exemplary validator methods for obtaining the characteristics of employed printing technologies in order to identify forgeries. It's a common form of forgery to use alternative printing techniques, such as photocopier, to duplicate the original document. In practice, the document authentication module 42 could use many more methods other than these exemplary three techniques presented here.

For example, Intaglio printing is a still widely used method invented in Germany by the 1430s for printing original documents. It engraves or cuts into a recessed plate, which fills with the ink and raises the imprinted area of paper with pressure so as to produce an engraved appearance with 3D effect. A cheap alternative often used for forgery is the thermograph (raised ink), which is used in printing like the commonly used business card.

Figure 14A:
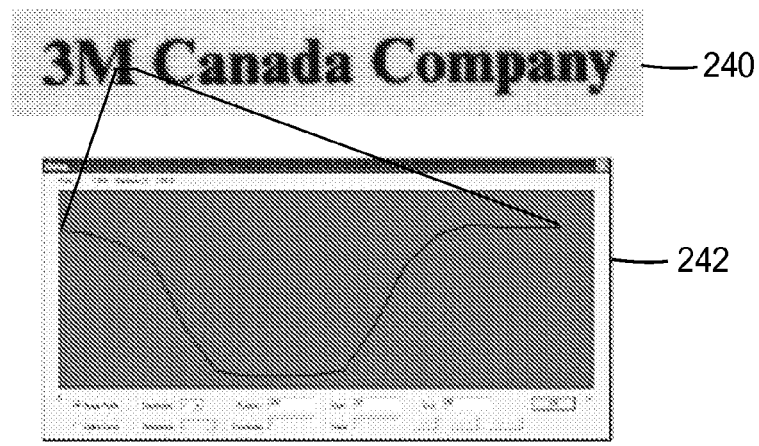
FIGS. 14A-14C are exemplary images as a document validation module by illustrating captured images and grey change profiles for characters within the images.
Figure 14B:
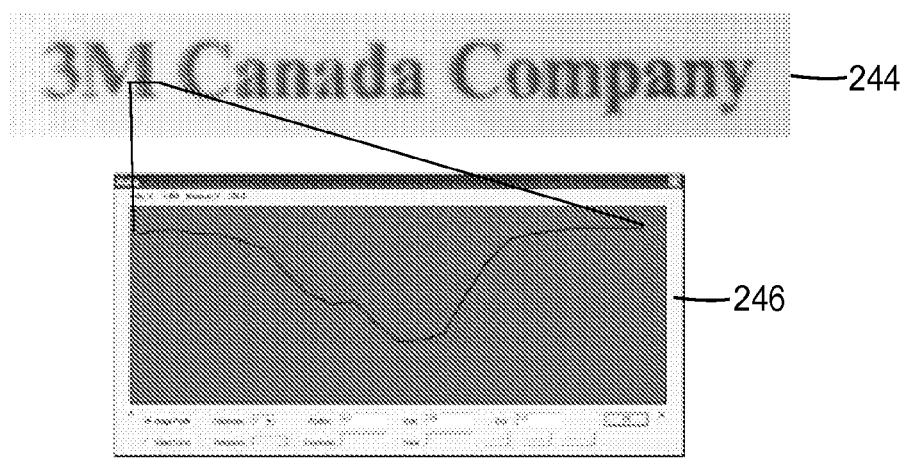

While viewing under the perspective environment with such as the CCD camera of the 3M document reader, some significant 3D visual effect can be captured. As in the sample of a 3M business card, image 240 in FIG. 14A is produced from a flatbed scanner and image 244 in FIG. 14B is captured by a document reader 11 of FIG. 1. As shown in FIG. 14B, image 240 shows 3D effect including shadows from the characters.

Taking the profile of the grey change moving horizontally across the right leg of the letter "M" in above two images, some significant difference can be seen in the pictures 242 of FIG. 14A and 246 of FIG. 14B; the grey level changes across the stroke in the scanner is always symmetric in profile 242 of FIG. 14A while the case from the CCD camera is not, as shown in profile 246 of FIG. 14B. The dark valley shifts towards the inner side to the origin place of the camera. By measuring across the whole view field, the amount of asymmetric shift demonstrated by each of the valleys changes and can be quantified in terms of a distance offset from the origin of the view field, as for the 3M business card in FIG. 14C. The unit of measure for the offset in the illustrated example is mil.

Figure 14C:
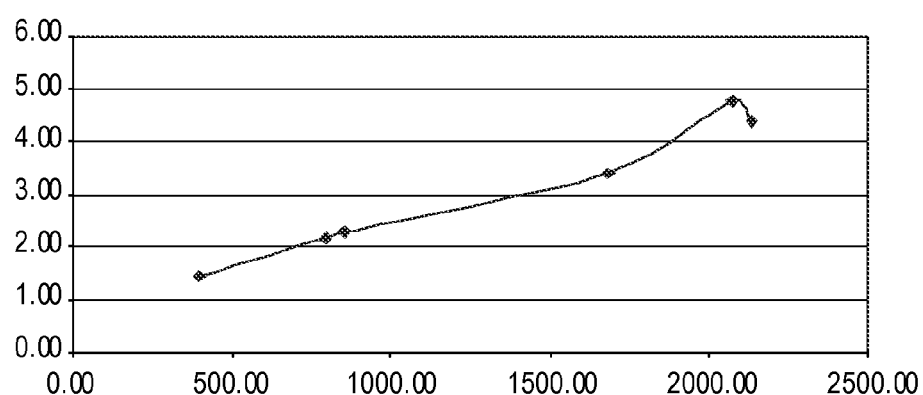

The techniques may readily be applied from so-called "Stereo from Shading" technology for confirming whether the asymmetry is present by measuring the precise 3D parameters from the image, such as how high the stroke raises, that could be determined by how steep the slope is in FIG. 14C.

Another printing technology is engraving, which produces the incision on the printing surface and, therefore, the opposite optical effect as from the above method. The profiling technique described above could likewise be employed to analyze the 3D characteristics of images and/or characters produced by such printing techniques.

Figure 15A:
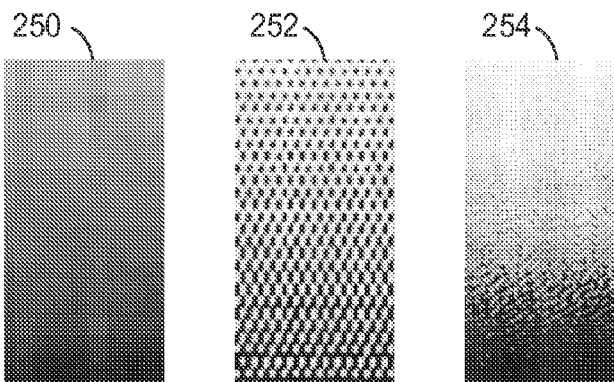
FIGS. 15A-15D and 16A-16C are exemplary images as document validation module by illustrating sample printing techniques and analysis thereof.

When printing an image onto a paper or other media, in addition to continuous imagery (e.g., photographs and ID printers), another two most commonly used reprographic techniques simulate the continuous tone image by binary one(s): the halftone screening technique (amplitude modulation) uses equally spaced dots of varying size, while the stochastic screening (frequency modulation) applies the same size dots in varying position and density. Samples of these printing techniques are shown in sample images 250, 252 and 254 in FIG. 15A.

The method of covariance matrix from the texture analysis is a good measurement on the regular spaced dots with the halftone screening, and high frequency noise or edge detection is an ideal indication for the stochastic screening.

Figure 15B:
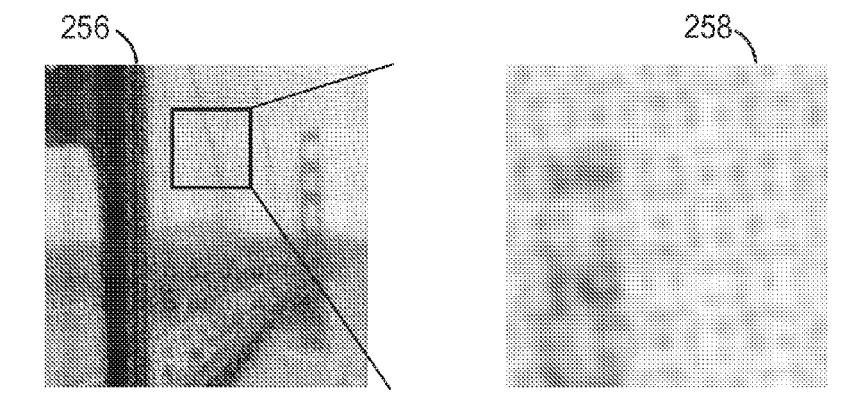

As another example, color images may be reconstructed usually by multiple screens, and in the halftone screening, CMYK four color planes in different angles combine the rosette patterns as shown in sample 256 in FIG. 15B and a zoom-in image 258 in FIG. 15B.

Figure 15C:
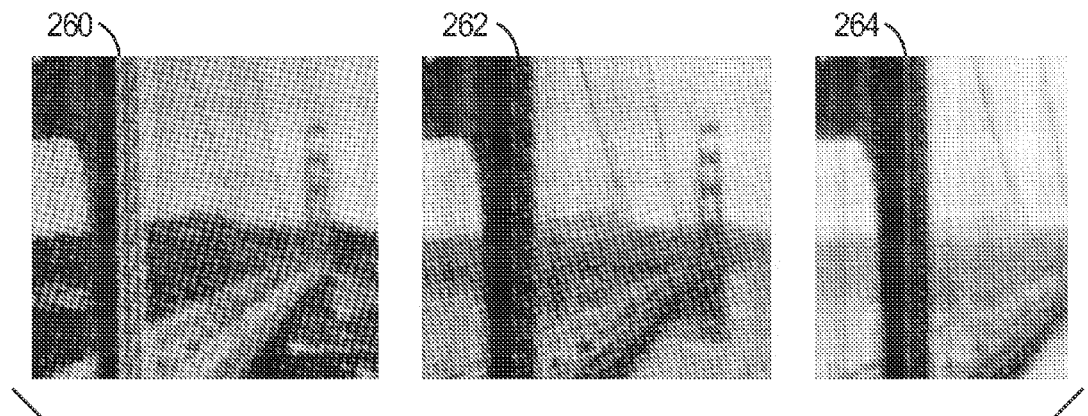

FIG. 15C shows a set of images sample images 260, 262 and 264 generated by decomposing the RGB planes of the image 256 captured by a color CCD camera. The set of images of FIG. 15C show angled screens in the sample images 260, 262 and 264 in FIG. 15C that can be similarly processed.

Figure 15D:
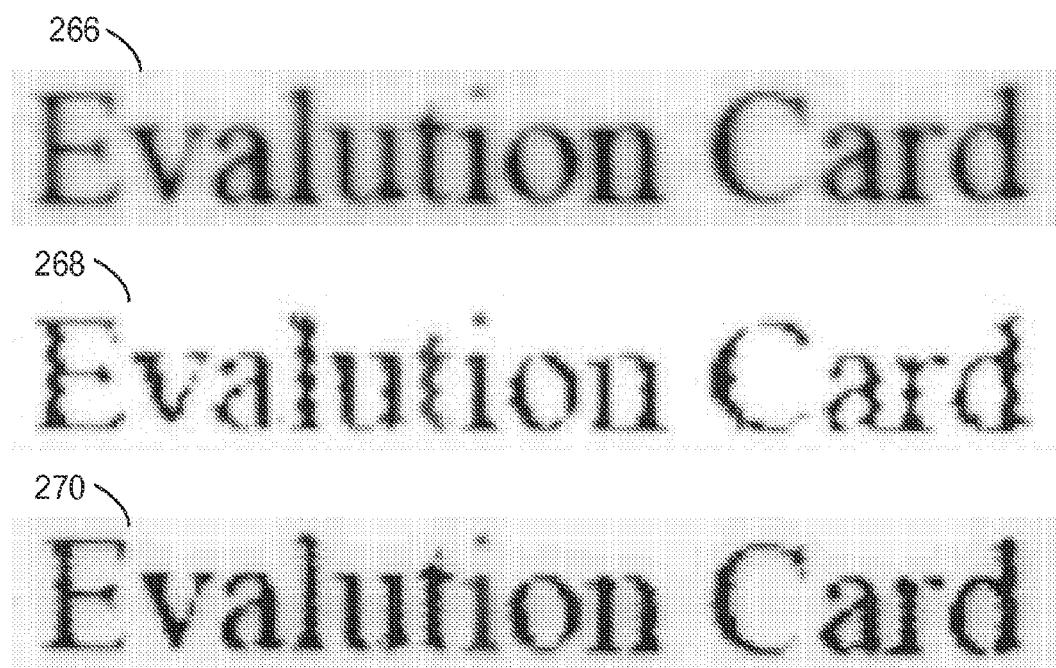

As the duplication is one of the most common cases in document forgery, the scanned text also changes by using different screening method, as the comparison in the images 266, 268 and 270 in FIG. 15D by the continuous tone, halftone and stochastic screening method respectively. In this case, variation of the stroke width and the edge curvature can be a good measurement of character distortion caused by the screening methods in the duplication of the original document.

In addition to above traditional printing techniques, many new methods are designed to not only limit reproduction of an image onto a media, but to also carry other information in a micro structure so as to further aid the prevention of forgery. While most of these methods could only be decoded by their own proprietary algorithms, it's still possible to use some simple way of feature extraction in image processing to confirm whether the feature is present or not for the authentication purpose in a cost-efficient solution. Some examples are discussed below.

Figure 16A:
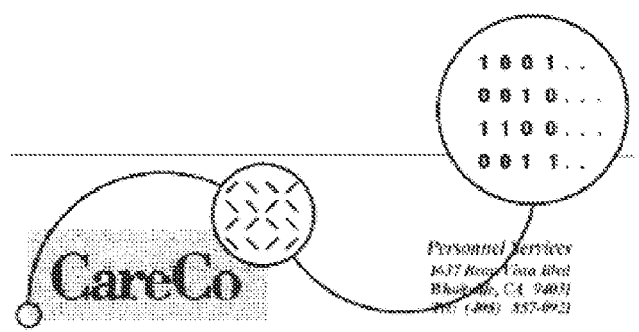

For example, some companies encode and decode a document containing machine-readable code overlaid by human-readable content such that the code and the human-readable content are both discernable. In operation, a background image is generated, wherein the background image comprises coded glyphtone cells based on grayscale image data values, each of the halftone cells comprising one of at least two distinguishable patterns as shown in FIG. 16A.

Figure 16B:

Another recently proposed method is based on phase modulation on the regular halftone screening by shifting some of the dots, as shown in the image 280 of FIG. 16B. In this case, placing a lenticular decoding lens with the same screening frequency makes the encoded letters "SI" visible in the image 282 of FIG. 16B. The techniques described herein may readily be applied to such images.

Figure 16C:
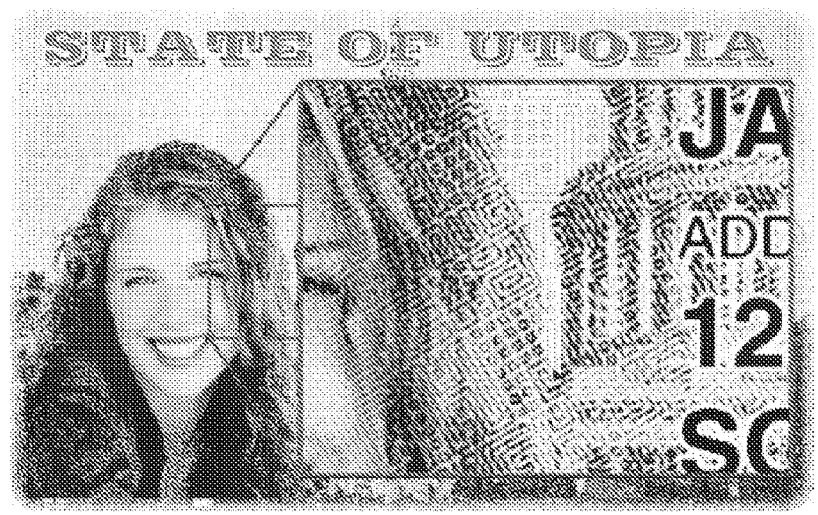

Another method converts the color or grayscale image plane(s) into microtype character layers with each layer arranged at a different angle relative to another layer. The microtype character width is modulated in width based on grayscale or color values, if multiply colored, as shown in FIG. 16C, and with the overlaid zoom-in image. The techniques described herein may readily be applied to such images.

Figure 17A:
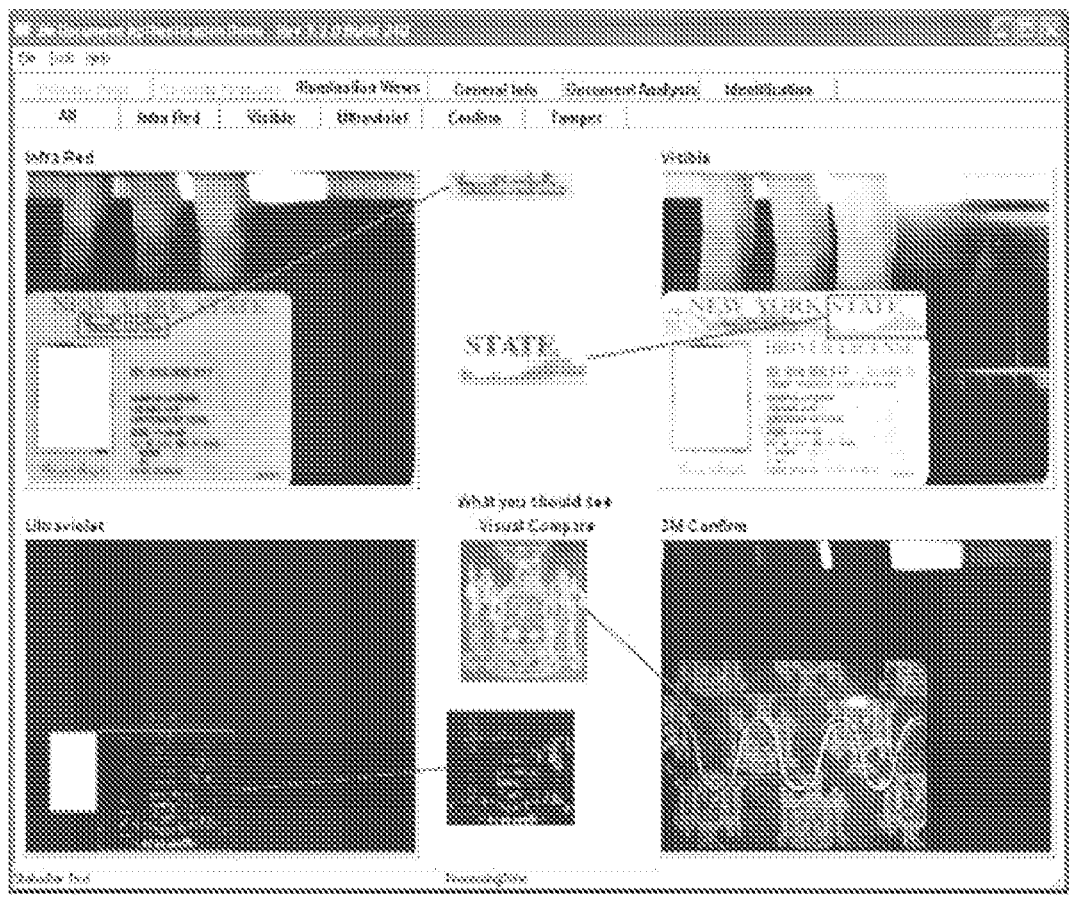
FIG. 17A-17C demonstrate the efficiency and high accuracy of the system when identifying and validating a current version of New York driver license from a set of 206 different US driver licenses without use of an ICAO-compliant MRZ zone.
Figure 17B:
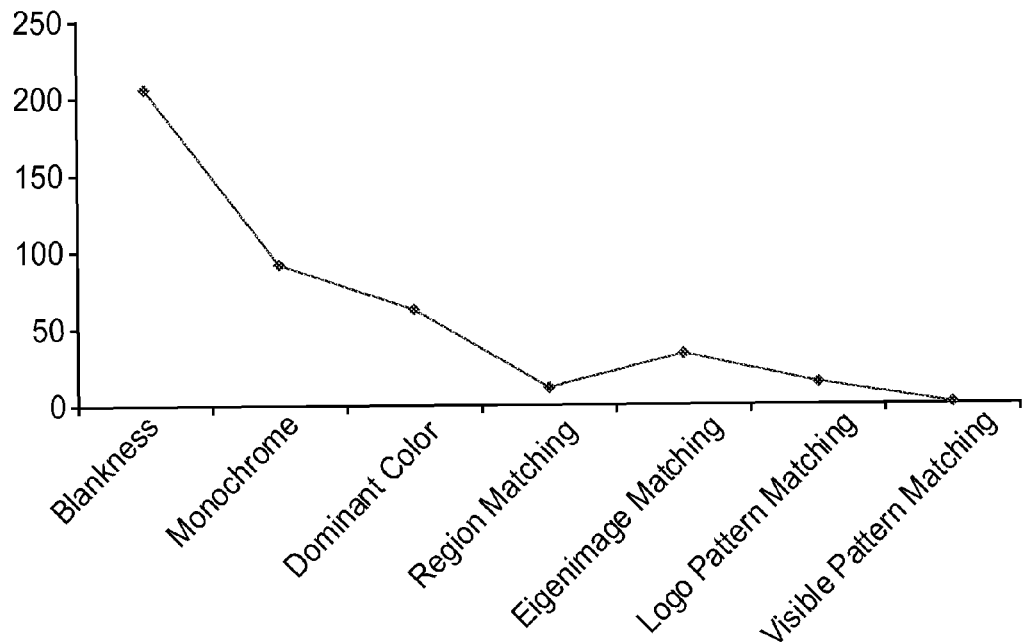
Figure 17C:
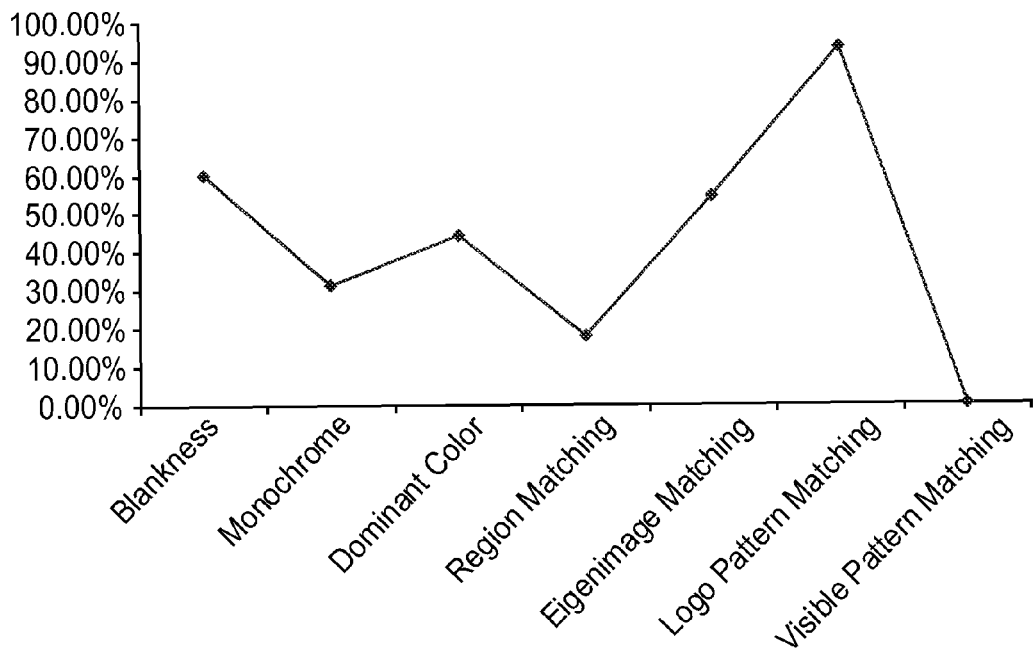
Figure 2:
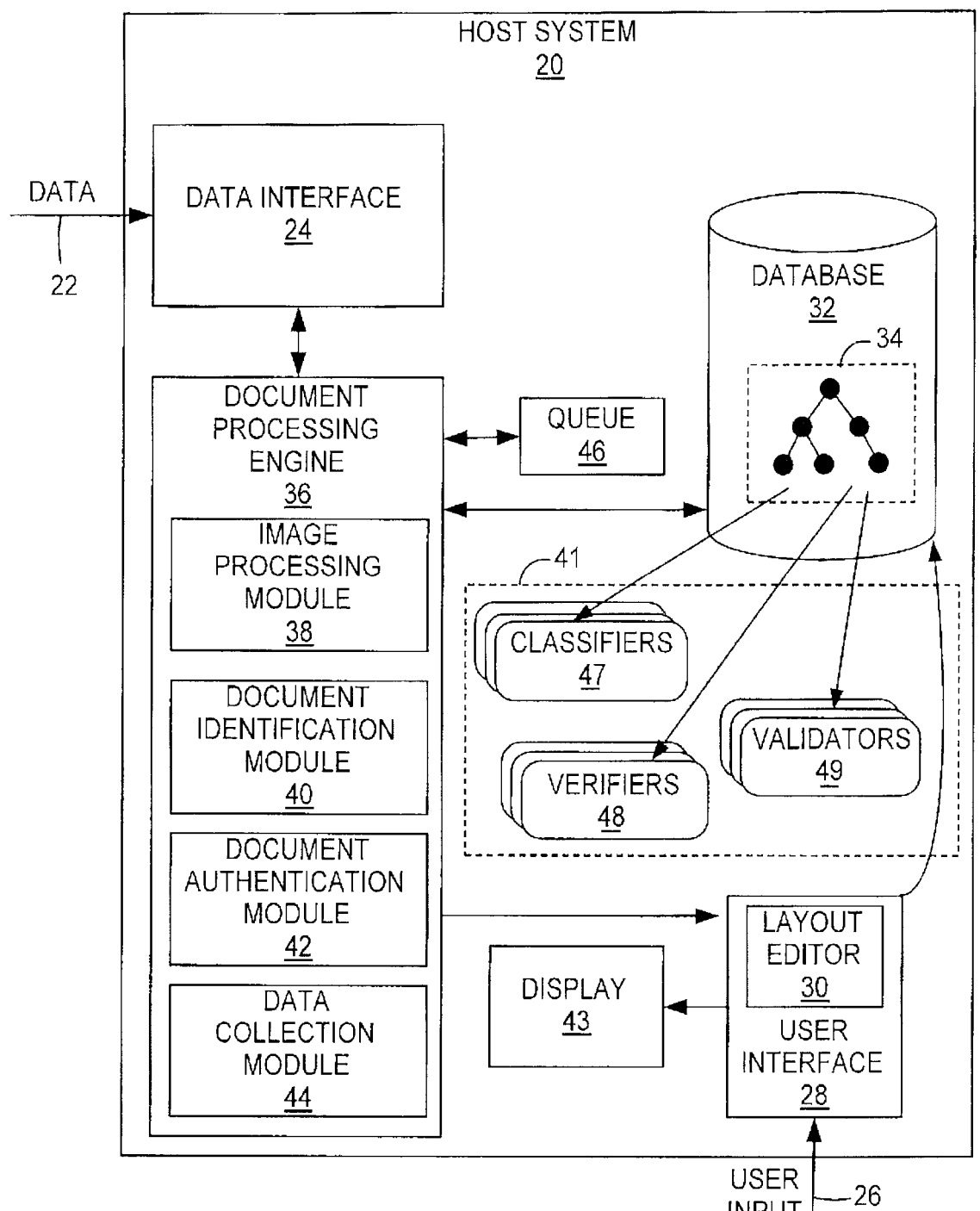

As an example to showcase how the system quickly and efficiently identifies documents with a high degree of accuracy, FIG. 17A-17C demonstrate the process of identifying and validating a current version of New York driver license from a set of 206 different US driver licenses without use of an ICAO-compliant MRZ zone. The implemented classifiers and verifiers that are invoked and applied to extract and recursively process attributes of the images are listed in Table I below:

TABLE I

| Classifier/Verifier | Lighting Source |
| --- | --- |
| Blankness | Infrared |
| Monochrome | Visible |
| Dominant Color | Visible |
| Layout Region Matching | Infrared |
| Eigenimage Document Matching | Visible |
| Logo Pattern Matching | Visible |
| Visible Pattern Matching | Visible |

The right column of Table I show the respective lighting source. This list is in the order of computation efficiency and executed in sequence. The last two are defined by two image pattern match expected in a document.

FIG. 17B shows how many document objects were examined in this example for each of the classifiers or verifiers in one testing. As shown, the Blankness classier/verifier checked on all 206 candidates at the start of the test and the Visible Pattern Matching classifier/verifier has been limited only to one possibility of the correct document type. The curve of FIG. 17B demonstrates how the candidate possibility is efficiently narrowed down in around 200 milliseconds. FIG. 17C shows the rejection rate of each operation, which represents the identification performance on the document identification framework with respect to this type of document. As the Logo Pattern Matching classifier/verifier has the highest performance of 93% rejection rate in regarding of identifying the correct document from 15 candidates and discarding other 14, it's also a relatively time-consuming operation.

FIG. 17A show part of the success validation results invoked after this document has been identified as the current New York driver license, as searching expected security image patterns in four images from Infrared, Visible, Ultraviolet and Retro-reflective respectively. The result is similar to those shown in shown in FIG. 8A after the system completes both identification and subsequent validation.

Various embodiments of the invention have been described. These and other embodiments are within the scope of the following claims.

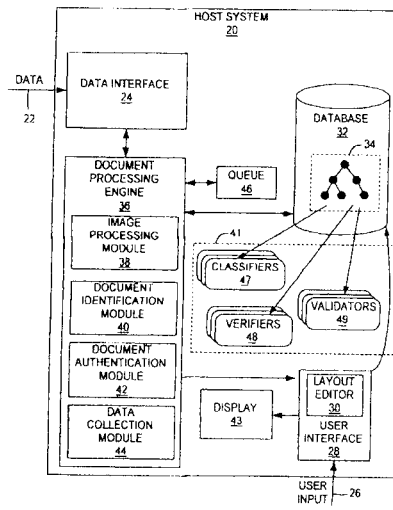

The invention claimed is:

1. A method for verifying an unknown document as one of a plurality of possible document types, the method comprising:

selecting one or more reference documents of different document types;

calculating, from the reference documents, one or more Eigen images and Eigen values for the plurality of different document types;

calculating a reference weight coefficient vector for each of the plurality of document types based on the Eigen images and Eigen values calculated from the reference documents;

receiving at least one captured image of an unknown document;

calculating a weight coefficient vector for the captured image;

comparing the weight coefficient vector of the captured image and each of the weight coefficient vectors of the document types to calculate a plurality of distances; and identifying the unknown document as one of the plurality of document types based on the plurality of calculated distances.

2. The method of claim 1,
wherein the Eigen images are othonormal and define a multi-dimensional space, and
wherein the plurality of distances represent distances of the captured image from the different document types in multi-dimensional space defined by the othonormal Eigen images.

3. The method of claim 2, wherein the each of the distances is expressed in the form of a certainty value for each possible document type that represents the distance on a unified scale.

4. The method of claim 1, wherein calculating a reference weight coefficient vector of the captured image comprises:
constructing a data matrix in which each column represents an Eigen image; and
multiplying the data matrix to produce the weight coefficient vector for the captured image, wherein each coefficient of the weight coefficient vector represents an expression of the captured image in multiple dimensional space formed by the othonormal Eigen images.

5. The method of claim 1, wherein calculating one or more Eigen images and Eigen values for a plurality of reference document types comprises:
collecting image templates for the possible document types;
normalizing the image data for these image templates as zero-mean;
forming a data matrix in which each column stores image data for a different one of the image templates;
calculating a set of Eigen vectors by computing the covariance matrix of the data matrix and sorting by respective Eigen values for each of the Eigen vectors;
applying a threshold to select only those Eigen vectors having Eigen values that exceed a threshold;
mapping the selected Eigen vectors back onto the Eigen images; and
storing the selected Eigen images.

6. The method of claim 1, wherein receiving at least one captured image includes receiving one or more of an infra-red (IR) image, a visible-light spectrum image, an ultraviolet (UV) image, and a retro-reflective image.

7. The method of claim 1, wherein receiving at least one captured image of the unknown document includes receiving a captured image of one of a passport, a driver's license, a birth certificate, a financial document, a commercial paper, an identification card, and a social security card.

8. The method of claim 1, further comprising:
storing, within a data structure, a plurality of document type objects that represent the possible reference document types,
wherein the plurality of document type objects reference a plurality of recursive software processes for extracting attributes from the captured image to categorize and verify the unknown document as one of the possible document types represented by one of the document type objects.

9. The method of claim 8, further comprising traversing the document type objects of the data structure in a variable order based on the attributes extracted by application of the plurality of the recursive processes to the captured image.

10. The method of claim 1, wherein one or more of the document type objects reference an Eigenimage identification process that selects the reference document types, calculates the reference weight coefficient vector of each of the plurality of possible reference documents, calculates the weight coefficient vector of the captured image, compares the weight coefficient vector of the captured image and each of the weight coefficient vectors of the possible reference documents to calculate a plurality of distances, and, based on the plurality of distances, identifies the unknown document as one of the plurality of possible document types.

11. The method of claim 10,
wherein storing the plurality of document type objects includes storing a classifier object that references one or more of the plurality of processes, and
wherein traversing the data structure includes traversing the classifier object to:
invoke the one or more processes referenced by the classifier object to determine a set of possible reference document type objects; and
traverse the set to identify the captured image as one of the plurality of possible reference document type objects.

12. The method of claim 10,
wherein storing the plurality of document type objects includes storing a minimum certainty value and a verifier object that references one or more of the plurality of processes, and
wherein traversing the set includes traversing the verifier object to:
invoke the one or more of the plurality of processes referenced by the verifier object;
calculate a certainty value from one or more return values received from invoking the one or more of the plurality of processes referenced by the verifier object to process attributes extracted from the unknown document by the classifier object in comparison to the reference document type objects; and
selectively discard one or more of the possible reference document type objects from the set based on the comparison between the certainty value and minimum certainty value.

13. The method of claim 1, further comprising:
invoking one or more of:
a first method to evaluate a possibility of a printing method for the unknown document is from intaglio or engrave printing technology;
a second method to discriminate a screening method used to print image and text; or
a third method to evaluate whether a printing material for the unknown document includes a micro structure; and
based on the possibility, determine whether the identified document is authentic or not.

14. The method of claim 1, further comprising identifying and verifying the unknown document as a security document that combines embedded electronic information includes one or more of radio frequency identification (RFID) data, electronic passport data, smartcard data, or magnetic strip data.

15. The security document authentication device of claim 14, wherein the document processing engine calculates and stores the one or more Eigen images and Eigen values for the plurality of reference document types by:
collecting image templates for the possible document types;
normalizing the image data for these image templates as zero-mean;
forming a data matrix in which each column stores image data for a different one of the image templates;
calculating a set of Eigen vectors by computing the covariance matrix of the data matrix and sorting by respective Eigen values for each of the Eigen vectors;

applying a threshold to select only those Eigen vectors having Eigen values that exceed a threshold; and mapping the selected Eigen vectors back onto Eigen images;

storing the selected Eigen images in the memory.

16. The method of claim 1, further comprising presenting results of the identification and verification process to a user in visual or sound format.

17. A security document authentication device comprising:
a memory storing one or more Eigen images and Eigen values for a plurality of reference document types;

an image capture interface that captures at least one image from an unknown document;

a document processing engine that, in response to the captured image, select one or more of the reference document types as possible reference document types, calculates a reference weight coefficient vector of each of the plurality of possible reference documents, calculates a weight coefficient vector of the captured image, compare the weight coefficient vector of the captured image and each of the weight coefficient vectors of the possible reference documents to calculate a plurality of distances, and, based on the plurality of distances, identifying the unknown document as one of the plurality of possible document types.

18. The security document authentication device of claim 17, wherein the document processing engine calculates the weight coefficient vector of the captured image by constructing a data matrix in which each column represents an Eigen image, and multiplying the data matrix to produce the weight coefficient vector for the captured image.

19. The security document authentication device of claim 17, wherein the document processing engine calculates and stores the one or more Eigen images and Eigen values for the plurality of reference document types.

20. The security document authentication device of claim 17,
wherein the memory stores a plurality of document type objects within a data structure according to a dynamic document identification framework, wherein the plurality of document type objects reference a plurality of recursive processes for extracting attributes from the captured image, wherein the document processing engine traverses the document type objects of the data structure in a variable order based on the attributes extracted by application of the plurality of the recursive processes to the captured image, and wherein the document processing engine identifies the unknown document as one of the plurality of document type objects upon traversing the data structure.

21. The security document authentication device of claim 17, wherein the image capture interface receives the captured image by receiving one or more of an infra-red (IR) image, a visible-light spectrum image, an ultraviolet (UV) image, and a retro-reflective image.

22. The security document authentication device of claim 17, wherein the image capture interface receives the captured image of the unknown document by receiving captured image of one of a passport, a driver's license, a birth certificate, a financial document, a commercial paper, an identification card, or a social security card.

23. A computer-readable storage medium comprising instructions for causing a programmable processor to:
calculating one or more Eigen images and Eigen values for a plurality of reference document types, receiving at least one captured image of an unknown document;

select one or more of the reference document types as possible reference document types, calculate a reference weight coefficient vector of each of the plurality of possible reference documents;

calculate a weight coefficient vector of the captured image;

compare the weight coefficient vector of the captured image and each of the weight coefficient vectors of the possible reference documents to calculate a plurality of distances; and based on the plurality of distances, identifying the unknown document as one of the plurality of possible document types.

* * * * *

UNITED STATES PATENT AND TRADEMARK OFFICE
CERTIFICATE OF CORRECTION

PATENT NO.       : 8,194,933 B2
APPLICATION NO.  : 11/955163
DATED            : June 5, 2012
INVENTOR(S)      : Yiwu Lei et al.

It is certified that error appears in the above-identified patent and that said Letters Patent is hereby corrected as shown below:

Delete title page and substitute the attached title page therefor.

Title Page, Column 1 (Inventors)
Line 1, delete "Ottowa," and insert -- Ottawa, --, therefor.

Title Page, Column 1 (Inventors)
Line 2, delete "Ottowa," and insert -- Ottawa, --, therefor.

Title Page 2, Column 1 (Other Publications)
Line 6, delete "Cgnitive" and insert -- Cognitive --, therefor.

Title Page 2, Column 2 (Other Publications)
Line 6, delete "Springer'Verlage," and insert -- Springer Verlag, --, therefor.

In the Drawings:

Sheet 2 of 22 (Box No. 36) (FIG. 2)
Line 2, delete "PRO CESSING" and insert -- PROCESSING --, therefor.
Delete page 2 of drawings and substitute the attached page 2 therefor.

Sheet 4 of 22 (Box No. 72) (FIG. 4)
Line 1, delete " IDENTIFIED " and insert -- IDENTIFIED --, therefor.

Sheet 6 of 22 (Box No. 112) (FIG. 6)
Line 1, delete "DOCUMNET?" and insert -- DOCUMENT? --, therefor.

Sheet 15 of 22 (Box No. 204) (FIG. 12)
Line 1, delete "CACULATION" and insert -- CALCULATION --, therefor.

Signed and Sealed this
Fourth Day of June, 2013

Teresa Stanek Rea
*Acting Director of the United States Patent and Trademark Office*

In the Specifications:

Column 1
Line 23 (Approx.), delete "Civic" and insert -- Civil --, therefor.

Column 2
Line 20, delete ""validators")." and insert -- "validators". --, therefor.

Column 6
Line 12, delete "modules (," and insert -- modules, --, therefor.

Column 8
Lines 32-33, delete "and or" and insert -- and/or --, therefor.

Column 17
Line 53, after "in" delete "that".

Column 22
Line 60, delete "othonormal" and insert -- orthonormal --, therefor.

Column 23
Lines 5-6, delete "Mahanalobis" and insert -- Mahalanobis --, therefor.

In the Claims:

Column 27
Line 5, in Claim 2, delete "othonormal" and insert -- orthonormal --, therefor.

Column 27
Line 9, in Claim 4, delete "othonormal" and insert -- orthonormal --, therefor.

Column 27
Line 22, in Claim 4, delete "othonormal" and insert -- orthonormal --, therefor.

CERTIFICATE OF CORRECTION (continued)

(12) United States Patent
Lei et al.

(10) Patent No.: US 8,194,933 B2
(45) Date of Patent: Jun. 5, 2012

(54) IDENTIFICATION AND VERIFICATION OF AN UNKNOWN DOCUMENT ACCORDING TO AN EIGEN IMAGE PROCESS

(75) Inventors: Yiwu Lei, Ottowa (CA); James E. MacLean, Ottowa (CA)

(73) Assignee: 3M Innovative Properties Company, St. Paul, MN (US)

( * ) Notice: Subject to any disclaimer, the term of this patent is extended or adjusted under 35 U.S.C. 154(b) by 1176 days.

(21) Appl. No.: 11/955,163

(22) Filed: Dec. 12, 2007

(65) Prior Publication Data
US 2009/0154778 A1   Jun. 18, 2009

(51) Int. Cl.
G06K 9/00   (2006.01)

(52) U.S. Cl. ........ 382/112; 382/218; 382/181; 382/209; 382/232; 382/276

(58) Field of Classification Search ........... 382/112, 382/218, 181, 209, 276, 305, 232; 250/559, 250/571; 375/340, 343; 358/403, 404; 707/821, 707/823, 825, 827, 828, 829, 830, 831
See application file for complete search history.

(56) References Cited

U.S. PATENT DOCUMENTS

| | | |
|---|---|---|
| 5,159,667 A | 10/1992 | Borrey et al. |
| 6,269,169 B1 | 7/2001 | Funk et al. |
| 6,288,842 B1 | 9/2001 | Florczak et al. |
| 6,631,204 B1 | 10/2003 | Smith |
| 6,785,405 B2 | 8/2004 | Tuttle et al. |
| 7,580,551 B1 * | 8/2009 | Srihari et al. ............ 382/115 |
| 7,912,291 B2 * | 3/2011 | Berkner et al. ............ 382/190 |
| 2001/0021270 A1 | 9/2001 | Kobara et al. |
| 2003/0108223 A1 | 6/2003 | Prokoski |
| 2004/0081332 A1 | 4/2004 | Tuttle et al. |
| 2006/0017959 A1 | 1/2006 | Downer et al. |
| 2007/0003147 A1 | 1/2007 | Viola et al. |
| 2007/0122007 A1 | 5/2007 | Austin et al. |
| 2007/0237427 A1 | 10/2007 | Patel et al. |
| 2008/0031542 A1 | 2/2008 | Lei |
| 2009/0152357 A1 | 6/2009 | Lei et al. |

FOREIGN PATENT DOCUMENTS

KR   10-2002-057522   7/2002
(Continued)

OTHER PUBLICATIONS

U.S. Appl. No. 11/955136, filed Dec. 12, 2007, Document Verification Using Dynamic Document Identification Framework.
(Continued)

*Primary Examiner* — Samir A. Ahmed
*Assistant Examiner* — Ali Bayat

(57) ABSTRACT

Techniques are described for identifying and validating security documents according to an Eigen image process method. For example, a security document authentication device selects one or more reference documents of different document types, calculates, from the reference documents, one or more Eigen images and Eigen values for the plurality of different document types, and calculates a reference weight coefficient vector of each of the plurality of document types. Upon receiving at least one captured image of an unknown document, the device calculates a weight coefficient vector of the captured image, compares the weight coefficient vector of the captured image and each of the reference weight coefficient vectors of the document types to calculate a plurality of distances, and, based on the plurality of distances, identifies the unknown document as one of the plurality of document types.

23 Claims, 22 Drawing Sheets